(12) United States Patent
Barkan et al.

(10) Patent No.: US 12,443,811 B2
(45) Date of Patent: Oct. 14, 2025

(54) SYSTEMS AND METHOD FOR ENABLING SELECTIVE USE OF ILLUMINATION COLOR TO CAPTURE APPROPRIATE DATA

(71) Applicant: ZEBRA TECHNOLOGIES CORPORATION, Lincolnshire, IL (US)

(72) Inventors: Edward Barkan, Miller Place, NY (US); Mark Drzymala, Saint James, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 113 days.

(21) Appl. No.: 18/375,955

(22) Filed: Oct. 2, 2023

(65) Prior Publication Data
US 2024/0028851 A1    Jan. 25, 2024

Related U.S. Application Data

(63) Continuation of application No. 17/474,658, filed on Sep. 14, 2021, now Pat. No. 11,775,784, which is a
(Continued)

(51) Int. Cl.
*G06K 7/12* (2006.01)
*G06K 7/10* (2006.01)
*G06K 7/14* (2006.01)

(52) U.S. Cl.
CPC ........... *G06K 7/12* (2013.01); *G06K 7/10198* (2013.01); *G06K 7/10415* (2013.01); *G06K 7/10821* (2013.01); *G06K 7/14* (2013.01)

(58) Field of Classification Search
CPC .. G06K 7/12; G06K 7/10198; G06K 7/10415; G06K 7/10821; G06K 7/14
(Continued)

(56) References Cited

U.S. PATENT DOCUMENTS

| 4,479,242 A | 10/1984 | Kurata |
| 5,083,638 A | 1/1992 | Schneider |
(Continued)

FOREIGN PATENT DOCUMENTS

EP    2293220 A2    1/2015

OTHER PUBLICATIONS

Novelty Search Report for Belgian Patent Application No. 2020/5504 mailed on Apr. 20, 2021.
(Continued)

*Primary Examiner* — Michael G Lee
*Assistant Examiner* — David Tardif
(74) *Attorney, Agent, or Firm* — Yuri Astvatsaturov

(57) ABSTRACT

A bioptic barcode reader is disclosed for selective use of illumination color to capture appropriate data. The bioptic barcode reader includes a housing and a primary imager positioned within the housing, configured to scan a target object during a first time period. The bioptic barcode reader further includes a primary illumination source positioned within the housing configured to emit primary illumination in a primary wavelength range during the first time period. The bioptic barcode reader further includes a secondary imager configured to capture one or more images of a target object during a second time period. The bioptic barcode reader further includes a secondary illumination source configured to emit secondary illumination in a secondary wavelength range during the second time period, wherein the second time period and first time period are interleaved and the secondary wavelength range is different from the primary wavelength range.

5 Claims, 18 Drawing Sheets

Related U.S. Application Data continuation of application No. 16/505,202, filed on Jul. 8, 2019, now Pat. No. 11,151,344.

(58) Field of Classification Search
USPC .......................................................... 235/454
See application file for complete search history.

(56) References Cited

U.S. PATENT DOCUMENTS

| | | | |
|---|---|---|---|
| 8,672,225 B2* | 3/2014 | Collins | G06K 7/1098 |
| | | | 235/462.01 |
| 2003/0136843 A1 | 7/2003 | Ralph et al. | |
| 2005/0247776 A1* | 11/2005 | Harper | G07C 9/257 |
| | | | 235/382 |
| 2005/0269405 A1 | 12/2005 | Throckmorton et al. | |
| 2008/0283603 A1 | 11/2008 | Barron et al. | |
| 2009/0250519 A1 | 10/2009 | Yamada et al. | |
| 2010/0027037 A1 | 2/2010 | Kuwahara | |
| 2010/0213259 A1 | 8/2010 | Gao | |
| 2010/0252633 A1* | 10/2010 | Barkan | G06K 7/1096 |
| | | | 235/462.24 |
| 2010/0270376 A1* | 10/2010 | McQueen | G06K 7/10722 |
| | | | 235/462.11 |
| 2011/0042591 A1 | 2/2011 | Kurose et al. | |
| 2013/0048733 A1 | 2/2013 | Marcus et al. | |
| 2013/0048850 A1 | 2/2013 | Vinogradov et al. | |
| 2013/0075472 A1 | 3/2013 | Collins et al. | |
| 2013/0306727 A1* | 11/2013 | Shearin | G06K 7/10 |
| | | | 235/440 |
| 2017/0147876 A1* | 5/2017 | Hagelin | G07F 7/12 |

OTHER PUBLICATIONS

International Search Report and Written Opinion for International Application No. PCT/US2020/041008 mailed on Oct. 5, 2022.

\* cited by examiner

SYSTEMS AND METHOD FOR ENABLING SELECTIVE USE OF ILLUMINATION COLOR TO CAPTURE APPROPRIATE DATA

CROSS-REFERENCE TO RELATED APPLICATION

This application is a continuation of U.S. patent application Ser. No. 17/474,658, filed on Sep. 14, 2021, which is a continuation of U.S. patent application Ser. No. 16/505,202, filed on Jul. 8, 2019, both of which are incorporated herein by reference in their entirety.

BACKGROUND OF THE INVENTION

Bioptic scanners have long been used to capture barcode data which is then used to look up the price of the item scanned. Barcode scanning is traditionally performed with monochromatic imaging. In other words, both the camera and the illumination source operate within a narrow bandwidth of the electromagnetic spectrum. Lasers are typically used as the illumination source to achieve this narrow bandwidth. Barcode scanning with monochrome imaging is cost effective, and for historic reasons, is traditionally performed in the red region of the visible electromagnetic spectrum. However, while bioptic scanners began as laser based systems, they have evolved into digital or camera based systems.

Digital or camera based bioptic imagers may be used for item recognition purposes. Contrary to barcode scanning, however, item recognition is typically performed with multicolor imaging. In other words, both the camera and the illumination source operate within a broad region of the visible spectrum.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
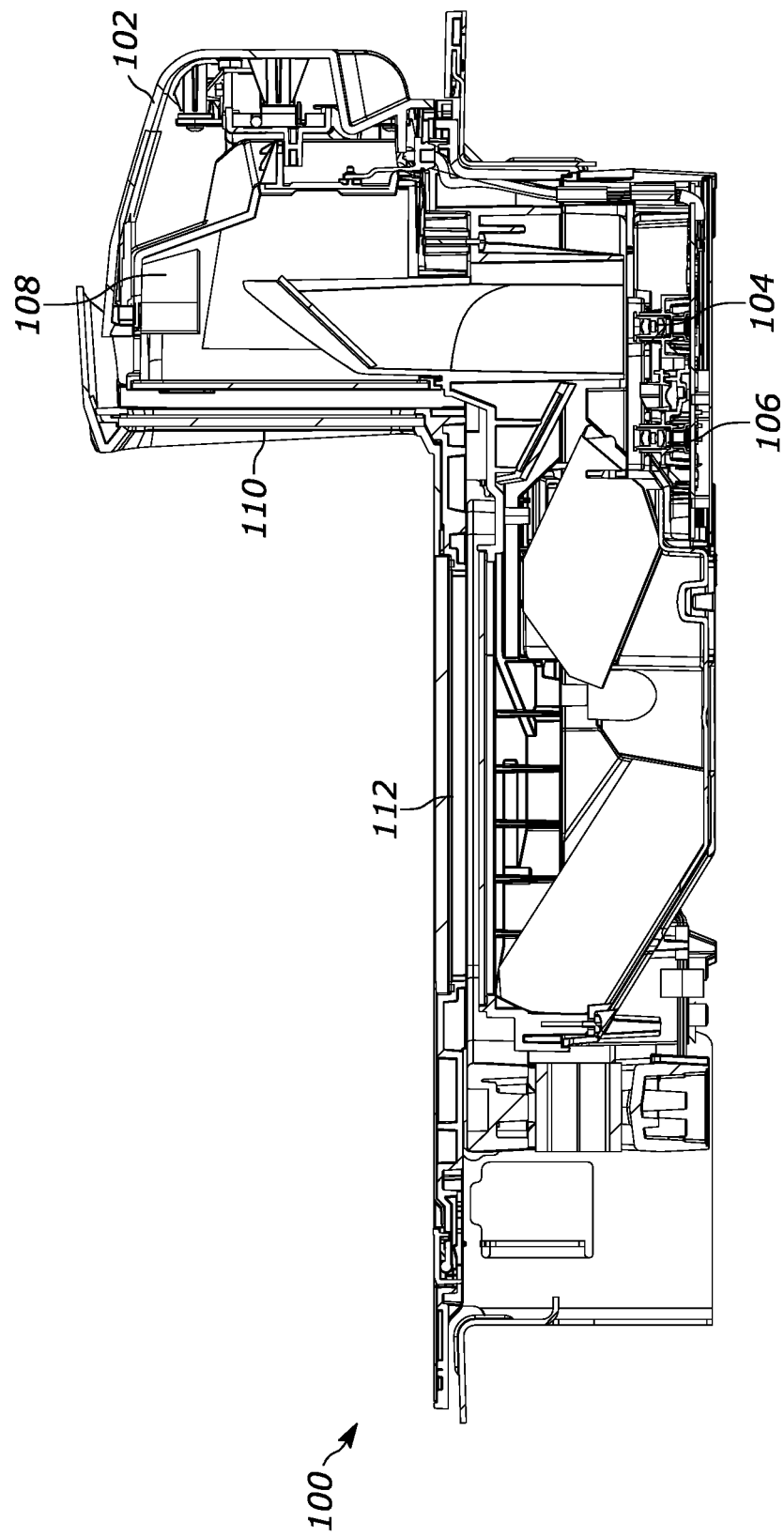
FIG. 1A illustrates a cross section view of an example bioptic barcode reader in accordance with various embodiments disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Traditional bioptic barcode readers do not possess the ability to perform both monochrome and multicolor imaging. Accordingly, there is a need for solutions that solve issues regarding scanners that cannot provide both monochromatic and multicolor illumination for a monochrome camera and a color camera, respectively.

In various embodiments of the present disclosure, a bioptic barcode reader, and related methods, are described for selective use of illumination color to capture appropriate data. The bioptic barcode reader, and related methods, of the present disclosure provide solutions where, e.g., a bioptic barcode reader is required to capture both barcode and object image data.

For example, when the bioptic barcode reader activates to capture barcode data, the monochromatic barcode imager may not register a barcode, e.g., a piece of produce lacking a barcode. In various embodiments, the disclosure of the present application describes a multicolor imaging system configured to capture color images of objects for analysis after the monochromatic barcode imaging process has failed to produce barcode data. The color images may be sent to a host computer for analysis to provide product identification despite the lack of a barcode. In this way, the disclosure of the present application provides store personnel at a point of purchase and others the ability to identify and accurately price products without a barcode.

Other benefits may be realized from the combined monochromatic and color imaging of the bioptic barcode reader. For example, the bioptic barcode reader of the present application may be used to detect when an object has been passed through the bioptic barcode reader without being imaged. The bioptic barcode reader of the present application could then alert store personnel that a theft event is in progress.

Additionally, the bioptic barcode reader of the present application may be used to detect when an imaged barcode is improperly affixed to a product with the intent to purchase the product at a lower price, i.e., "ticket switching." The bioptic barcode reader of the present application would detect an object passing through its optical field of view (FOV) and activate to capture a barcode. After capturing a barcode, the multicolor imaging system of the bioptic barcode reader would activate to capture a color image of the product. Upon comparison, the bioptic barcode reader of the present application would detect a mismatch between the product identified from the color image and the product identified in the imaged barcode. The bioptic barcode reader of the present application could then alert store personnel the imaged barcode has been improperly affixed to the imaged product.

Turning now to the figures, FIG. 1A illustrates a perspective view of an example bioptic barcode reader 100 in accordance with various embodiments disclosed herein. Bioptic barcode reader 100 includes a housing 102 and a primary imager assembly including one or more primary imagers, represented collectively as elements 104 and 106. These two primary imagers may be a vertical imager 104 and a horizontal imager 106. The primary imager assembly 104, 106 may include two cameras for the purpose of capturing 1D or 2D images (e.g., barcodes). The primary imager assembly 104, 106 is configured to capture one or more first images of a barcode associated with a target object during a first time period. Thereafter, for example, a processor (not shown) may analyze the one or more first images of the barcode to decode information from the barcode. These processors may be contained in the primary imager assembly or the one or more primary imagers, such that the one or more primary imagers may be configured to read one or more barcodes associated with the one or more target objects.

In certain embodiments, the primary imager assembly 104, 106 is a bioptic camera positioned at a surface of a point of sale (POS) station. Additionally, the vertical imager 104 may be a color camera, monochromatic camera, RFID sensor, or any other suitable imaging device. In certain embodiments, the horizontal imager 106 may be a color camera, monochromatic camera, RFID sensor, or any other suitable imaging device.

Bioptic barcode reader 100 further includes a primary illumination assembly 108. The primary illumination assembly 108 is positioned within the housing 102, and is configured to emit a primary illumination during at least a part of the first time period. In certain embodiments, the primary illumination assembly 108 is operable in an enabled state and a disabled state. In these embodiments, the primary illumination assembly 108 is optimized for reading the one or more barcodes in the enabled state.

For example, the primary imager assembly 104, 106 may activate to capture the one or more first images during the first time period. Accordingly, the primary illumination assembly 108 may emit the primary illumination through a substantially vertical imaging window 110 and/or a substantially horizontal imaging window of the bioptic barcode reader 100. The primary illumination assembly 108 may begin emitting the primary illumination before the first time period, and may continue emitting the primary illumination until the end, before the end, or after the end of the first time period. Similarly, the primary illumination assembly 108 may begin emitting the primary illumination after the beginning of the first time period, and may stop emitting the primary illumination before the end, until the end, or after the end of the first time period. Moreover, and as discussed further herein, the primary illumination assembly 108 may emit the primary illumination at intervals (i.e., illumination pulses) before, during, and/or after the first time period, but during at least a part of the first time period.

The primary illumination has a primary illumination wavelength range. In certain embodiments, the primary illumination is monochromatic illumination, and the primary illumination wavelength range is in the near-infrared spectrum or any other suitable wavelength range to scan 1D or 2D images, including white light.

The substantially vertical imaging window 110 and the substantially horizontal imaging window 112 define an optical FOV for the bioptic barcode reader 100. For example, this optical FOV may allow the bioptic barcode reader 100 to scan five or more sides of any object passing through the optical FOV.

As further described herein, the bioptic barcode reader 100 may be configured to automatically activate upon an object's entry into the optical FOV. In certain embodiments, once the object enters the optical FOV, the primary illumination assembly 108 may activate to emit the primary illumination through the substantially vertical imaging window 110. The primary imager assembly 104, 106 may then activate to capture an image of the object. It is to be understood however, that activation of the bioptic barcode reader 100 need not be automatic upon an object entering the optical FOV. Activation of the bioptic barcode reader 100 may occur through any suitable means, including manual activation.

Accordingly, activation of the bioptic barcode reader 100, e.g., via an object entering the optical FOV, may cause the bioptic barcode reader 100 to capture image data. Such image data may include, for example, product codes (e.g., barcodes or QR codes) associated with corresponding products as well as visual images of the product being scanned, as further described herein.

Figure 1B:
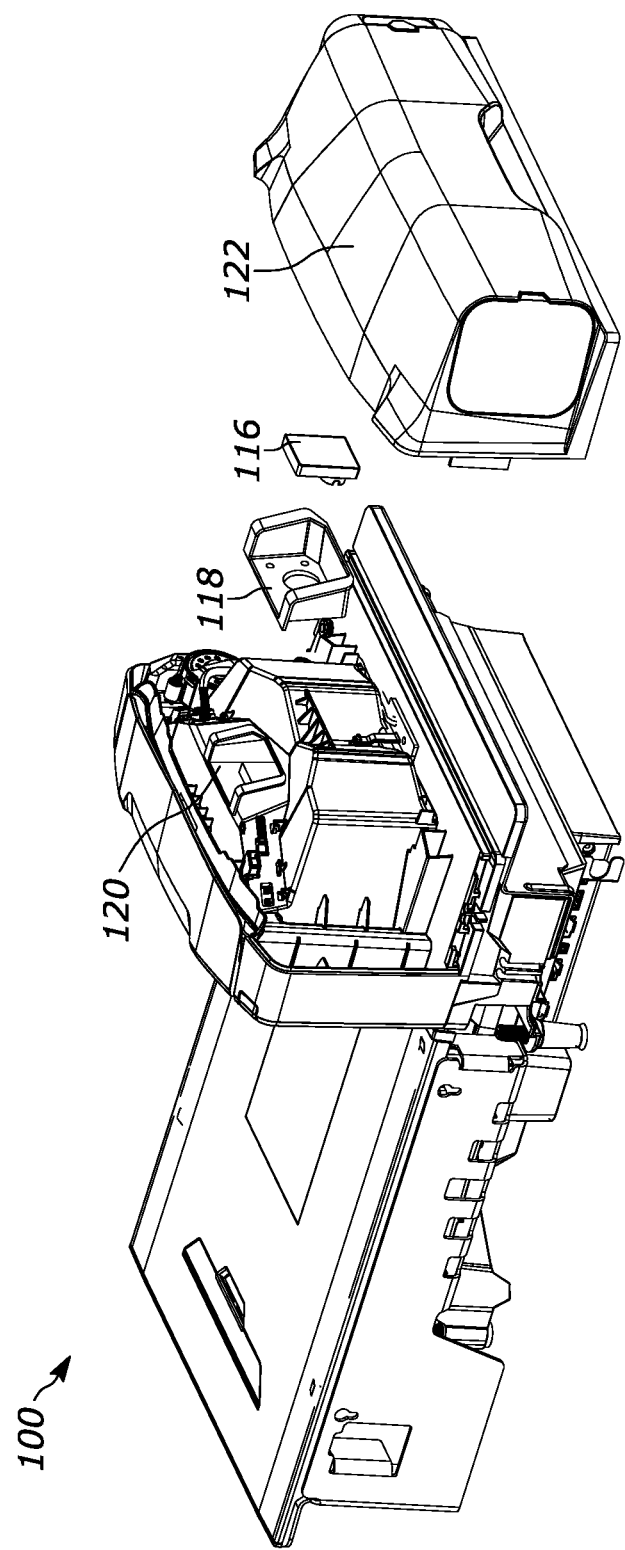
FIG. 1B illustrates an exploded view of the example bioptic barcode reader of FIG. 1A in accordance with various embodiments regarding selective use of illumination color to capture appropriate data as disclosed herein.

FIG. 1B illustrates an exploded view of the example bioptic barcode reader 100 of FIG. 1A in accordance with various embodiments regarding selective use of illumination color to capture appropriate data as disclosed herein. Bioptic barcode reader 100 includes a secondary imager assembly 116 including one or more secondary imagers. The one or more secondary imagers are configured to capture one or more second images of the target object. The one or more secondary imagers are further configured to capture the one or more second images during a second time period. In certain embodiments, the secondary imager assembly 116 is a color camera positioned at an area above the surface of the POS station. In other embodiments, the secondary imager assembly 116 is positioned externally from the housing (e.g., housing 102).

In certain embodiments, the one or more secondary imagers are configured to capture the one or more secondary images of the one or more target objects when the primary illumination assembly 108 is in either of the enabled state or the disabled state. For example, the one or more secondary imagers may be configured to capture the one or more secondary images while the primary illumination assembly 108 is in the enabled state (i.e., emitting the primary illumination), or using only ambient light (i.e., without the primary illumination).

To illustrate, if a user wishes to purchase a piece of fruit, the user will pass any barcode(s) affixed to or otherwise associated with the piece of fruit through the bioptic barcode reader's 100 FOV. Once the piece of fruit passes through the bioptic barcode reader's 100 FOV, the primary imager assembly 104, 106 will activate to capture the one or more first images of the one or more barcodes of the piece of fruit, and the primary illumination assembly 108 will emit the primary illumination (i.e., operate in the enabled state). The secondary imager assembly will then activate to capture the one or more second images of the piece of fruit. Accordingly, the secondary imager assembly may activate while the primary illumination assembly 108 is still emitting the primary illumination, or may activate after the primary illumination assembly has finished emitting the primary illumination.

The second time period is sequenced after or is partially overlapped with the first time period. Hence, the secondary imager assembly 116 is configured to capture the one or more second images of the target object after the primary imager assembly 104, 106 has captured the one or more first images of the barcode associated with the target object.

For example, and in certain embodiments, the first time period and the second time period comprise a duty cycle. Further in this example, the first time period comprises a first portion of the duty cycle, and the second time period comprises a second portion of the duty cycle. The primary imager assembly 104, 106 and the secondary imager assembly 116 may be active for the same period of time, and thus each comprise one half of the duty cycle of the bioptic barcode reader 100. However, the secondary imager assembly 116 and the primary imager assembly 104, 106 may be active for unequal periods of time, and thus comprise unequal portions of the duty cycle of the bioptic barcode reader 100.

Additionally, the secondary imager assembly 116 may be configured to capture a landscape and/or portrait image of the target object during the second time period. For example, the secondary imager assembly 116 in a landscape orientation may be able to achieve capturing the one or more second images of the target object with a wide horizontal field of view (FOV) (e.g., horizontal FOV of ~70 degrees) over the bioptic barcode reader 100 imaging surface. Similarly, the secondary imager assembly 116 in a portrait orientation may be able to achieve capturing the one or more second images of the target object with a wide vertical FOV (e.g., vertical FOV of ~70 degrees) over the bioptic barcode reader 100 imaging surface.

In certain embodiments, the secondary imager assembly 116 may be configured to activate when a target object enters the optical FOV of the bioptic barcode reader 100. It should be understood, that the secondary imager assembly 116 may be configured to activate before the primary imager assembly 104, 106.

The data or information captured from either the primary imager assembly 104, 106 and/or the secondary imager assembly 116 may be transmitted to POS stations, servers, or other processing devices for a variety of purposes including, e.g., product purchases, data storage, inventory purposes, etc.

Bioptic barcode reader 100 further includes a secondary imager assembly holder 118 and a secondary imager assembly opening 120. The secondary imager assembly holder 118 is designed to couple the secondary imager assembly 116 with the secondary imager assembly opening 120. The secondary imager assembly holder 118 and secondary imager assembly opening 120 place the secondary imager assembly 116 in a position to capture the one or more second images of the target object. In certain embodiments, the secondary imager assembly holder 118 may be adjustable between portrait and landscape orientations, as discussed herein.

The bioptic barcode reader 100 further includes an adjustable exterior covering 122. The adjustable exterior covering 122 may be a part of the housing 102, and may be detachable from the remainder of the bioptic barcode reader 100. For example, in certain embodiments, when portrait orientation images are desired, the adjustable exterior covering 122 may be removed, and the secondary imager assembly holder 118 may be adjusted to facilitate the secondary imager assembly 116 capturing the one or more second images in a portrait orientation.

Figure 2:
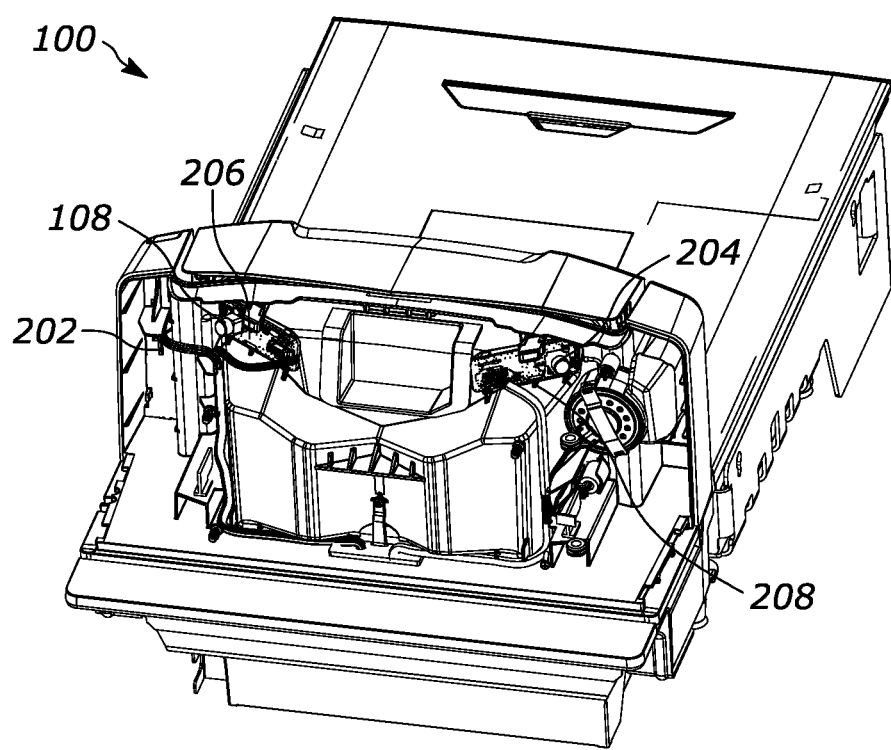
FIG. 2 illustrates a cross section view of the example bioptic barcode reader of FIG. 1A in accordance with various embodiments regarding selective use of illumination color to capture appropriate data as disclosed herein.

FIG. 2 illustrates a cross section view of the example bioptic barcode reader 100 of FIG. 1A in accordance with various embodiments regarding selective use of illumination color to capture appropriate data as disclosed herein. Bioptic barcode reader 100 includes the primary illumination assembly 108 and a secondary illumination assembly 204. The secondary illumination assembly 204 is configured to emit a secondary illumination during at least a part of the second time period. The secondary illumination has a secondary illumination wavelength range, which is different from the primary wavelength range of the primary illumination emitted by the primary illumination assembly 108. In certain embodiments, the secondary illumination assembly 204 is positioned externally from the housing (e.g., housing 102).

In certain embodiments, the secondary illumination is multicolor illumination. in these embodiments, the secondary wavelength range includes a composition of wavelengths sufficient to create substantially white light. For example, the secondary wavelength range may include a composition of light from the blue and yellow ranges of the visible spectrum to create a type of substantially white light.

The bioptic barcode reader 100 illustrated in FIG. 2. further includes a primary controller 206 configured to control the primary illumination from the primary illumination assembly 108. For example, the primary controller 206 may activate the primary illumination assembly 108 once the target object enters the optical FOV.

The bioptic barcode reader 100 illustrated in FIG. 2 further includes a secondary controller 208 configured to control the secondary illumination of the secondary illumination assembly 204. The secondary controller 208 is separate from the primary controller 206. For example, the secondary controller 208 may activate the secondary illumination assembly 204 after the primary controller 206 has activated and deactivated the primary illumination assembly 108. In certain embodiments, the secondary controller 208 may activate the secondary illumination assembly 204 once the target object enters the optical FOV. In other embodiments, the primary controller 206 and secondary controller 208 may activate the primary illumination assembly 108 and the secondary illumination assembly 204 simultaneously.

In certain embodiments, the bioptic barcode reader 100 may comprise a controller configured to sequentially capture (i) a plurality of primary images of the one or more barcodes with the primary imager assembly and (ii) a plurality of the one or more images with the secondary imager assembly, wherein the plurality of primary images of the one or more barcodes are sequenced between the plurality of the one or more secondary images. For example, the bioptic barcode reader 100 may take a series of the one or more first images and the one or more second images in a staggered fashion, where capturing one of the one or more first images is followed sequentially by capturing one of the one or more second images, and so on. In these embodiments, for example, the primary controller 206 or the secondary controller 208, alone or in combination, may perform this function.

Moreover, in these embodiments, the controller is further configured to output a trigger signal to the secondary imager assembly 116 to enable functionality of the second imager assembly 116 to capture the plurality of the one or more secondary images. For example, the controller may receive a signal from the primary imager assembly 104, 106, indicating that the primary imager assembly 104, 106 has captured one of the one or more first images. Alternatively, the controller may also monitor a threshold (e.g., the first time period) associated with the primary imager assembly 108 capturing one of the one or more first images. Once the controller detects that the primary imager assembly 108 has breached the threshold (e.g., controller has not received a signal indicating a successful capture of one of the one or more first images during or after the first time period), the controller may output the trigger signal.

The bioptic barcode reader 100 illustrated in FIG. 2 further includes a monitoring circuit 202 communicatively coupled to the primary controller 206 and the secondary controller 208. As further discussed herein, after the primary controller 206 deactivates the primary illumination assembly 108, the primary controller 206 sends a primary signal to the monitoring circuit 202. The primary signal indicates to the monitoring circuit 202 that the primary illumination assembly 108 has been deactivated. The monitoring circuit 202 then generates and sends a secondary signal to the secondary controller 208 to indicate the secondary illumination source 204 should be activated. Finally, upon receipt of the secondary signal, the secondary controller 208 activates the secondary illumination source 204. Thus, the secondary signal is sequenced after the primary signal.

Figure 3:
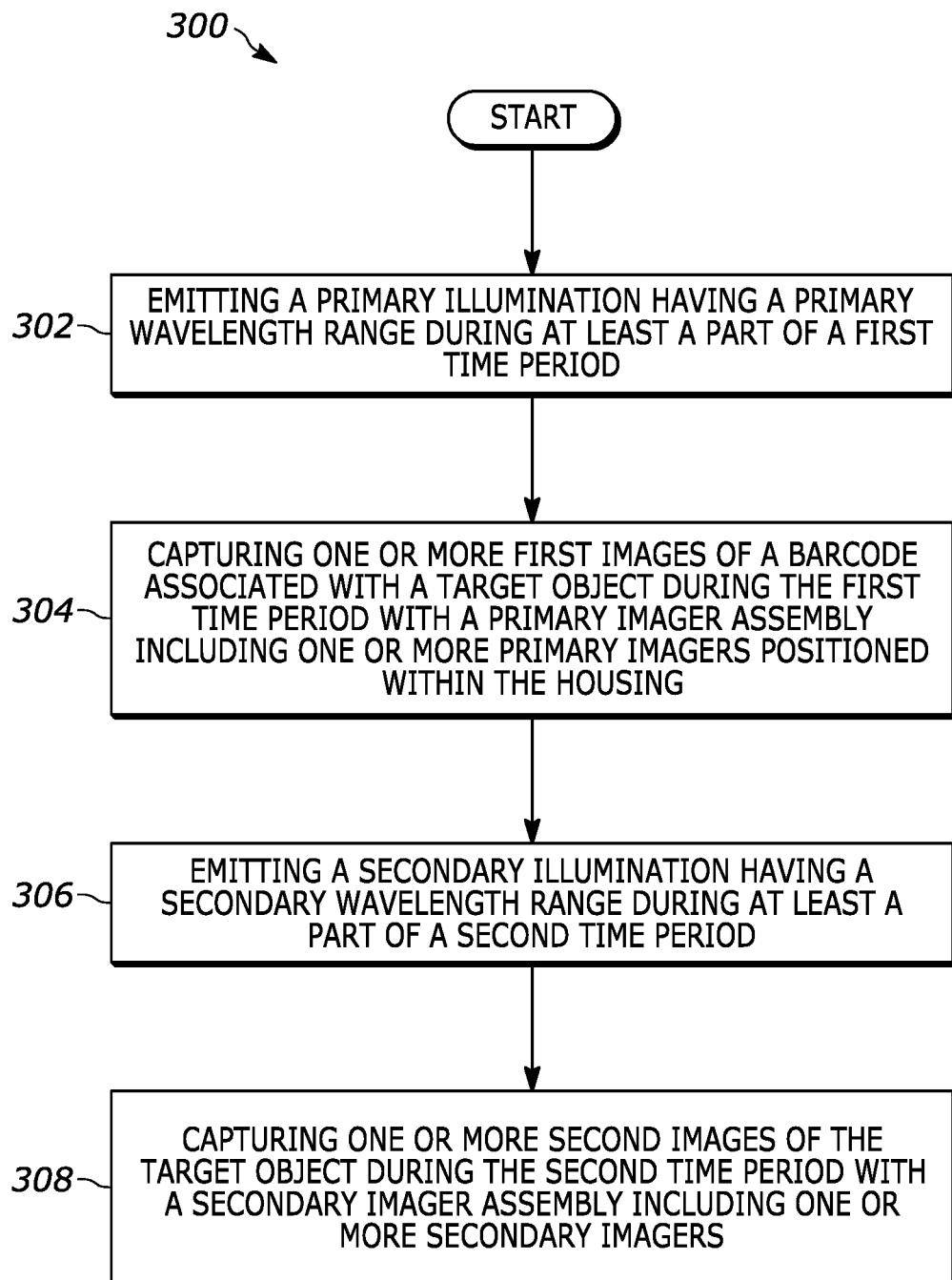
FIG. 3 illustrates a method of using the example bioptic barcode reader of FIG. 1A and FIG. 1B for selective use of illumination color to capture appropriate data in accordance with various embodiments disclosed herein.

FIG. 3 illustrates a method of using the example bioptic barcode reader 100 for selective use of illumination color to capture appropriate data in accordance with various embodiments disclosed herein. Method 300 begins at block 302, where, for example, the primary illumination assembly 108 emits the primary illumination, having a primary wavelength range, during at least a part of a first time period. For example, and as discussed herein, the primary illumination assembly 108 may begin emitting the primary illumination before or during the first time period, and may stop emitting the primary illumination before the end, at the end, or after the end of the first time period.

As mentioned in reference to FIG. 1A, the primary illumination assembly 108 may emit the primary illumination at intervals (i.e., illumination pulses) before, during, and/or after the first time period, but during at least a part of the first time period. For example, if the first time period is 1 second in duration, the primary illumination assembly 108 may emit the primary illumination at intervals before, during, and/or after that one second. To illustrate, the primary illumination assembly 108 may emit a first illumination pulse at the beginning of the 1 second of the first time period. The first illumination pulse may last 10 milliseconds (ms), such that 990 milliseconds of the first time period remain after the first illumination pulse. Hence, the primary illumination assembly 108 may then emit a second illumination pulse of 10 ms after 400 ms of the first time period have elapsed, such that 590 ms of the first time period remain after the second illumination pulse.

At block 304, method 300 includes capturing the one or more first images of a barcode associated with the target object during the first time period with the primary imager assembly 104, 106 including the one or more primary imagers positioned within the housing. The barcode associated with the target object may be one or more barcodes, and the barcode may not be attached to the target object. For example, if a user wishes to purchase an item that is cumbersome or cannot otherwise be brought to a POS station, the user may take one or more barcodes associated with that object to the POS station to execute the purchase.

At block 306, method 300 includes emitting the secondary illumination having the secondary wavelength range during at least a part of the second time period. The secondary illumination is emitted by the secondary illumination assembly 204.

At block 310, method 300 includes capturing the one or more second images of the target object during the second time period with the secondary imager assembly 116 including one or more secondary imagers. Returning to the fruit example discussed herein, the user may place the piece of fruit in the POV of the bioptic barcode reader 100 in an attempt to scan one or more barcodes that may be affixed to the fruit's surface. However, if the piece of fruit lacks a decodable barcode (e.g., the piece of fruit's barcode is obscured, defaced, or otherwise undiscernible, or the piece of fruit lacks a barcode entirely), the one or more first images will not identify the fruit, and the user will not complete their transaction.

Thus, the one or more second images, as captured by the secondary imager assembly 116, may still positively identify the piece of fruit based on image analysis of the fruit's visual appearance. Simply put, the bioptic barcode reader 100 may identify the target object through image analysis (i.e., machine learning, neural networks, etc.) if the target object lacks a decodable barcode.

Additional embodiments, features, or functionality may also be implemented for method 300 in accordance with the disclosures herein for the bioptic barcode reader 100 or as described elsewhere herein. Furthermore, the functions or operations shown in FIG. 3 may be performed in any suitable order, any desired number of times, and/or with any suitable variation to the particular order and/or combination shown so as to achieve a desired result, such as a desired manner of operating a bioptic barcode reader.

Camera systems are being increasingly incorporated into POS stations. These systems are desired primarily for their machine vision applications (e.g., fruit identification, AR database building, etc.) and anti-theft applications (e.g., sweethearting, ticket-switching, etc.). Ideally, a camera system for those applications is placed so that it can view objects crossing the platter of a bioptic scanner at the POS.

However, this can be an issue since the Bioptic scanners utilize a flashing illumination that is duty cycled to correspond to the imaging sensor frames for each field of view. An auxiliary camera that is monitoring that location will end up seeing flashes of illumination that do not correspond to its own image capture frames.

Especially with machine vision applications, this can be problematic, because it can create flashes that blind the camera, illumination hotspots on the item, or, in the case of red illumination, change the color appearance of the item in question. This creates a multitude of issues that prevent a customer from using a camera that isn't fully integrated with whatever bioptic scanning system they utilize.

Figure 4:
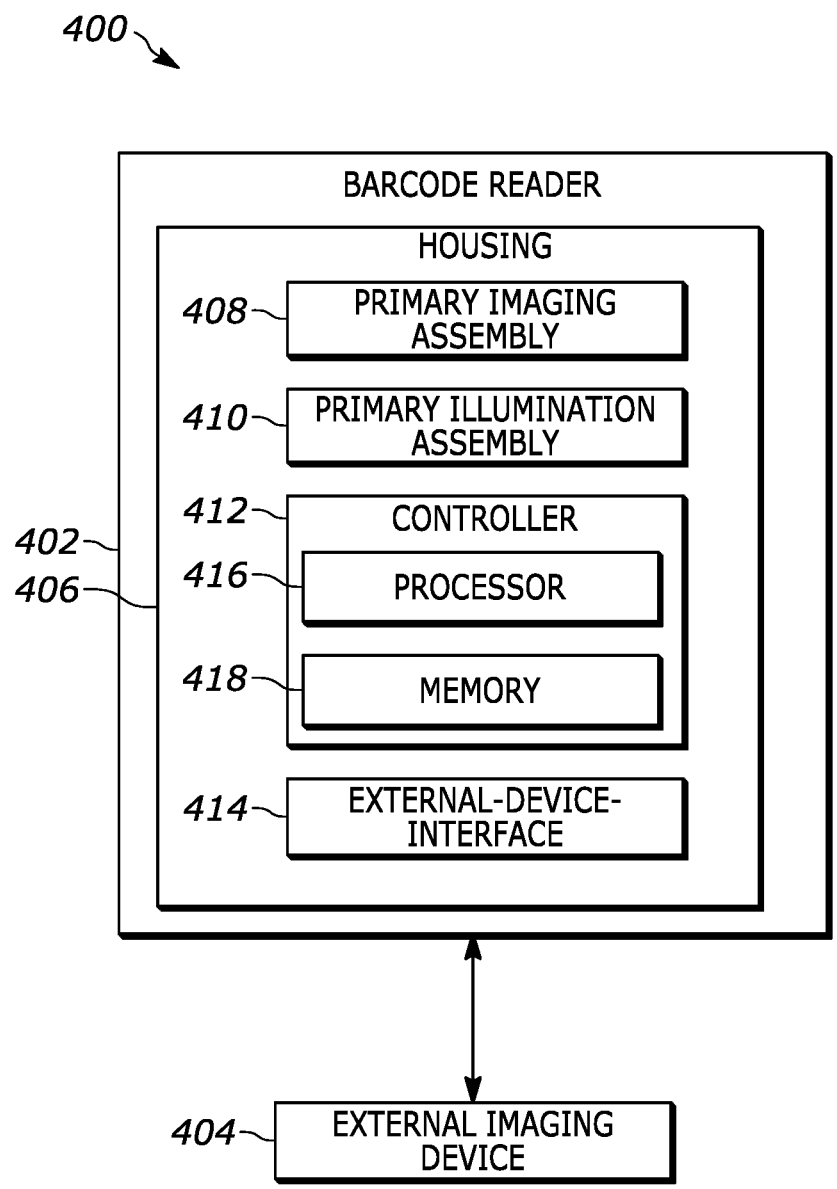
FIG. 4 illustrates an example system for synchronizing illumination for an auxiliary camera of a bioptic barcode reader.

FIG. 4 illustrates an example system 400 for synchronizing illumination for an auxiliary camera of a bioptic barcode reader. The example system 400 includes a barcode reader 402 and an external imaging device 404. The external imaging device 404 may be any suitable imaging device (e.g., camera, video camera, IR sensor, depth sensor, etc.).

The barcode reader 402 includes a housing 406, a primary imaging assembly 408, a primary illumination assembly 410, a controller 412, and an external-device-interface 414. Both of the primary imaging assembly 408 and the primary illumination assembly 410, are positioned within the housing 406. The external-device-interface 414 is positioned at least partially within the housing, and the controller 412 may be positioned completely within, partially within, or completely outside the housing.

The primary imaging assembly 408 is configured to capture a plurality of images of an environment appearing within a FOV of the primary imaging assembly 408. The plurality of images may all be captured consecutively, or, as discussed further herein, may be sequenced according to signals transmitted by the controller 412. Moreover, the environment appearing within the FOV of the primary imaging assembly 408 may include a target object. For example, a user may attempt to purchase an item at a POS station by passing the item through the FOV of the primary imaging assembly 408. The primary imaging assembly 408 may then capture a plurality of images of the environment appearing within its FOV, which includes the target object.

The primary imaging assembly 408 is further configured to capture the plurality of images at a predetermined framerate. For example, the primary imaging assembly 408 may be configured to capture the plurality of images at a framerate of 60 frames per second (fps). As further discussed herein, this predetermined framerate may be communicated to the primary imaging assembly 408 by, for example, the controller 412.

In certain embodiments, the primary imaging assembly 408 may include one or more primary imagers. The one or more primary imagers may be configured to capture the a plurality of first images of the environment appearing within the FOV during a scanning session. The scanning session includes one or more frames, and the one or more primary imagers captures each of the plurality of first images during a respective first duration of each of the one or more frames of the scanning session. In these embodiments, the primary imaging assembly 408 is also configured to capture the plurality of first images at a predetermined framerate.

The primary illumination assembly 410 is configured to provide primary illumination over at least a portion of the environment appearing within the FOV of the primary imaging assembly 408. The primary illumination may be composed of any combination of wavelengths of light operable to allow the primary imaging assembly 408 to capture the plurality of images. For example, the primary illumination may be multicolor illumination, such as a composition of wavelengths sufficient to create substantially white light. To illustrate, the primary illumination may include a composition of light from the blue and yellow ranges of the visible spectrum to create a type of substantially white light. In another example, the primary illumination may be monochromatic, such as light from the red range of the visible spectrum.

Additionally, the at least a portion of the environment appearing within the FOV of the primary imaging assembly 408 may be any portion sufficient to allow the primary imaging assembly 408 to capture the plurality of images. For example, the at least a portion of the environment may include the portion of the environment that, as discussed further herein, includes the target object. To illustrate, if a user attempts to purchase an item at a POS station by passing the item through the FOV of the primary imaging assembly 408, the primary illumination assembly 410 may provide the primary illumination over the portion of the FOV such that the item is fully or partially illuminated by the primary illumination.

In certain embodiments, the primary illumination assembly 410 is configured to provide the primary illumination to at least a portion of the environment, wherein the primary illumination assembly provides the primary illumination as a series of primary illumination pulses. The series of primary illumination pulses is emitted during a respective second duration of each of the one or more frames of the scanning session. Moreover, in these embodiments, the respective second duration is different from the respective first duration.

The controller 412 is communicatively coupled to the primary imaging assembly 408, the primary illumination assembly 410, and the external-device-interface 414. The controller 412 also includes a processor 416 and a memory 418. (Although referenced herein as a "processor" and a "memory," it should be understood that a processor may be one or more processors, and a memory may be one or more memories.)

The memory 418 stores instructions that, when executed by the processor 416, cause the controller 412 to transmit an image-capture signal to the primary imaging assembly 408. The image-capture signal causes the primary imaging assembly 408 to capture a series of primary image frames. Each of the series of primary image frames is captured over a respective first duration D1. Each of the series of primary image frames is separated from another one of the series of primary image frames by a respective second duration D2. A beginning of each of the series of primary image frames is separated from a beginning of each subsequent one of the series of primary image frames by a third duration D3.

To illustrate, the respective first duration, D1, is the duration when the primary imaging assembly 408 captures a series of primary image frames. After the respective first duration, the primary imaging assembly 408 stops capturing the series of primary image frames over a respective second duration, D2. After the respective second duration, the primary imaging assembly 408 has reached a subsequent respective first duration, D1, during which, the primary imaging assembly 408 captures another series of primary image frames. The combination of the respective first duration, D1, and the respective second duration, D2, is encapsulated in the respective third duration, D3, which defines the total separation between each of the series of primary image frames.

The memory 418 stores instructions that, when executed by the processor 416, further cause the controller 412 to transmit a primary-illumination-on signal to the primary illumination assembly 410. The primary-illumination-on signal causes the primary illumination assembly 410 to emit the primary illumination. The primary illumination has a series of primary illumination pulses, and each of the series of primary illumination pulses is emitted over a respective fourth duration D4. Each of the series of primary illumination pulses is separated from another one of the series of primary illumination pulses by a respective fifth duration D5. It should be understood that, in various embodiments, the controller 412 may transmit the primary-illumination-on signal to the primary illumination assembly 410 before or after the controller 412 transmits the image-capture signal to the primary imaging assembly 408.

To illustrate, the respective fourth duration, D4, is the duration when the primary illumination assembly 410 emits a series of primary illumination pulses. After the respective fourth duration, the primary illumination assembly 410 stops emitting the primary illumination pulses over the respective fifth duration, D5. After the respective fifth duration, the primary illumination assembly 410 has reached a subsequent respective fourth duration, D4, during which, the primary illumination assembly 410 emits another series of primary illumination pulses.

In certain embodiments, the respective first duration D1 is equal to the respective fourth duration D4. For example, in these embodiments, the primary imaging assembly 408 will capture a series of primary image frames for the same amount of time that the primary illumination assembly 410 will emit a series of primary illumination pulses. In this way, the primary imaging assembly 408 will capture each of the series of primary image frames with primary illumination from the primary illumination assembly 410.

Similarly, in these embodiments, the respective second duration D2 is equal to the respective fifth duration D5. For example, in these embodiments, the primary imaging assembly 408 will stop capturing a series of primary image frames for the same amount of time that the primary illumination assembly 410 will stop emitting the primary illumination pulses. In this way, the primary illumination assembly 410 will not provide primary illumination pulses over a duration when the primary imaging assembly 408 is not capturing a series of primary image frames (i.e., when the primary illumination pulses would be unnecessary).

In certain embodiments, the instructions, when executed by the processor 416, further cause the controller 412 to transmit the image-capture signal to the primary imaging assembly 408 to cause the primary imaging assembly 408 to capture the series of primary image frames. Each of the series of primary image frames are captured over the respective first duration. Further in these embodiments, the instructions, when executed by the processor 416, further cause the controller 412 to transmit the primary-illumination-on signal to cause the primary illumination assembly 410 to emit the primary illumination during the respective second duration. Still further in these embodiments, the instructions, when executed by the processor 416, further cause the controller 412 to transmit, substantially concurrently with the transmission of the primary-illumination-on signal, an interleave signal to the external-device-interface 414. The interleave signal is operative to communicate, via the external-device-interface 414, at least one characteristic associated with at least one of the primary-illumination-on signal and the image-capture signal. Moreover, the controller 412 may iteratively perform outputting the primary-illumination-on signal, outputting the image-capture signal, and transmitting the interleave signal for each respective frame of the scanning session.

In certain embodiments, the instructions, when executed by the processor 416, further cause the controller 412 to transmit the image-capture signal to the primary imaging assembly 408 before the controller transmits the primary-illumination-on signal to the primary illumination assembly 410. In other embodiments, the instructions, when executed by the processor 416, further cause the controller 412 to transmit both the primary-illumination-on signal to the primary illumination assembly 410 and transmit the image-capture signal to the primary imaging assembly 408 simultaneously.

The memory 418 stores instructions that, when executed by the processor 416, further cause the controller 412 to transmit, substantially concurrently with the transmission of the primary-illumination-on signal, an interleave signal to the external-device-interface 414. The interleave signal is operative to communicate, via the external-device-interface 414, at least one characteristic associated with at least one of the primary-illumination-on signal and the image-capture signal.

To illustrate, the controller 412 may transmit the interleave signal to the external-device interface 414 to provide information to the external imaging device 404. Further, the controller 412 may transmit the interleave signal substantially concurrently with the transmission of the primary-illumination-on signal to provide the information to the external imaging device 404 as quickly as possible.

For example, if the external imaging device 404 is a camera, by providing the information to the external imaging device 404 in this way, the interleave signal enables the external imaging device 404 to synchronize the external imaging device's 404 capture frames in between the illumination flashes of the barcode reader 402 (i.e., the series of illumination pulses emitted by the primary illumination assembly 410). In other words, the interleave signal enables the external imaging device 404 to limit the external imaging device's 404 exposures to avoid the series of primary illumination pulses saturating or otherwise affecting the external imaging device's 404 exposures.

In certain embodiments, the at least one characteristic is at least one of a length of (i) the respective first duration D1, (ii) the respective second duration D2, (iii) the respective third duration D3, (iv) the respective fourth duration D4, and (v) the respective fifth duration D5. For example, the at least one characteristic may be the length of the respective first duration D1 such that the interleave signal communicates the length of the duration when the primary imaging assembly 408 captures a series of primary image frames. This would enable the external imaging device 404 to, for example, limit the external imaging device's 404 exposures to durations when the primary imaging assembly 408 stops capturing the series of primary image frames (e.g., the respective second duration D2). Alternatively, the external imaging device 404 may use the length of the respective first duration D1 to intentionally limit the external imaging device's 404 exposures to the respective first durations D1. If, for example, the external imaging device 404 uses a similar illumination to the primary imaging assembly 408, the external imaging device 404 may capitalize on that fact by exposing the external imaging device 404 at the same time as the primary imaging assembly 408.

In another example, the at least one characteristic may be the length of the respective second duration D2 such that the interleave signal communicates the length of the duration over which each of the series of primary image frames is separated from another one of the series of primary image frames. Similar to the length of the respective first duration, transmitting the length of the respective second duration would enable the external imaging device 404 to, for example, limit the external imaging device's 404 exposures to durations when the primary imaging assembly 408 stops capturing the series of primary image frames.

In another example, the at least one characteristic may be the length of the respective third duration D3 such that the interleave signal communicates the length of the duration over which the beginning of each of the series of primary image frames is separated from a beginning of each subsequent one of the series of primary image frames. Transmitting the respective third duration would enable the external imaging device 404 to, for example, limit the external imaging device's 404 exposures based on the length of the total duration of each primary image frame.

In another example, the at least one characteristic may be the length of the respective fourth duration D4 such that the interleave signal communicates the length of the duration over which the primary illumination assembly 410 emits a series of primary illumination pulses. This would enable the external imaging device 404 to, for example, limit the external imaging device's 404 exposures to durations when the primary illumination assembly 410 stops emitting the series of primary illumination pulses. If the external imaging device 404 is configured to capture images with a form of light other than the light provided by the primary illumination assembly 410, then the external imaging device 404 can limit its exposure to durations in the primary image frame other than the respective fourth duration.

In another example, the at least one characteristic may be the length of the respective fifth duration D5 such that the interleave signal communicates the length of the duration over which each of the series of primary illumination pulses is separated from another one of the series of primary illumination pulses. Transmitting the respective fifth duration would enable the external imaging device 404 to, for example, limit the external imaging device's 404 exposures to durations in the primary image frame completely or partially comprising the respective fifth duration.

Owners of a bioptic scanner may wish to integrate a color camera in order to accomplish several tasks. Namely, this includes: product recognition to build a neural network database, vegetable identification for easier self-checkout, catching sweethearting, and ticket-switching. To best serve these purposes, it is desirable to have a color camera that has a good FOV coverage across, above, and to the sides of the platter area. Thus, a larger FOV is generally preferable.

However, the larger the required FOV becomes, the fewer locations are available to place the color camera with respect to the bioptic. Moreover, a larger FOV combined with a limited number of available locations can give rise to other problems. For example, if a single imaging system is unable to capture a full image of a target object, a composite image may be generated through image processing algorithms (e.g., image stitching). Traditional image stitching algorithms suffer from a lack of ability (or at least a lack of efficiency) to analyze and properly stitch images of a particular item that are taken from different distances from the item.

Figure 5A:
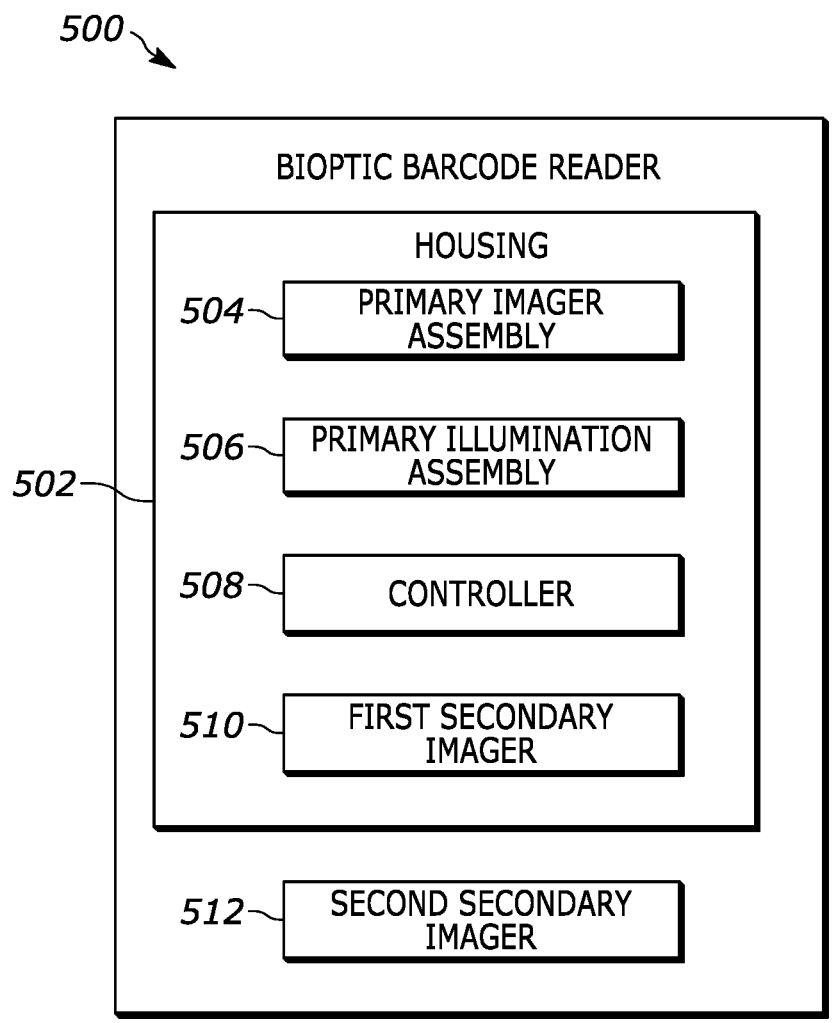
FIG. 5A illustrates an example bioptic barcode reader featuring a stacked composition of a multicolor camera assembly and a monochromatic camera assembly.

FIG. 5A illustrates an example bioptic barcode reader 500 featuring a stacked composition of a multicolor camera assembly and a monochromatic camera assembly. The example bioptic barcode reader 500 includes a housing 502. The bioptic barcode reader 500 further includes a primary imager assembly 504, a primary illumination assembly 506, a controller 508, and a secondary imager assembly (represented collectively by a first secondary imager 510, and a second secondary imager 512).

The primary imager assembly 504 includes one or more primary imagers, each of which is positioned within the housing 502. Each of the one or more primary imagers is configured to capture one or more first images of one or more barcodes of one or more target objects.

The primary illumination assembly 506 is positioned within the housing 502, and is operable in an enabled state and a disabled state. The primary illumination assembly 506 is configured to emit a primary illumination optimized for capturing the one or more first images of the one or more barcodes in the enabled state. For example, in the enabled state, the primary illumination assembly 506 may emit the primary illumination as a combination of a variety visible spectrum wavelengths (e.g., a combination of wavelengths to produce substantially white light) or a monochromatic visible spectrum wavelength (e.g., red light). In certain embodiments, the primary illumination assembly 506 emits primary illumination which is monochromatic illumination including near-infrared light.

The secondary imager assembly 510, 512 is configured to capture one or more second images of the one or more target objects when the primary illumination assembly is in either of the enabled state or the disabled state. However, in certain embodiments, the secondary imager assembly 510, 512 is configured to capture one or more second images of the one or more target objects only when the primary illumination assembly 506 is in the disabled state. The first secondary imager 510 is positioned within the housing 502, and the first secondary imager 510 has a first optical FOV 514.

The second secondary imager 512 has a second optical FOV 516, and is positioned above the housing 502. Specifically, the second secondary imager 512 is positioned above the housing 502 such that an overlap of the first optical FOV 514 with the second optical FOV 516 occurs approximately equidistant from both the first secondary imager 510 and the second secondary imager 512. In certain embodiments, the second secondary imager 512 is adjustably positioned above the housing 502.

Figure 5B:
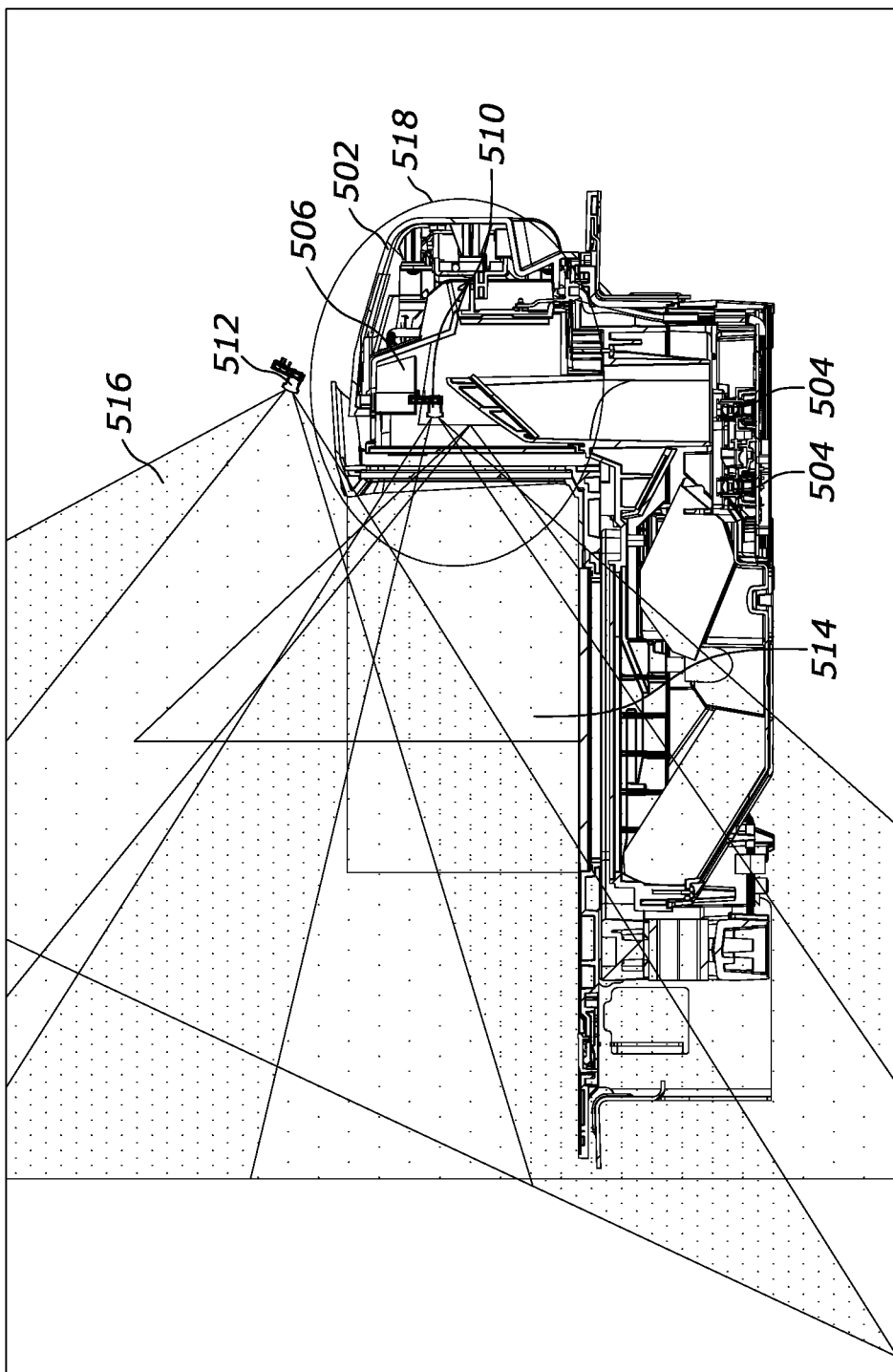
FIG. 5B is a profile cutaway view of the example bioptic barcode reader of FIG. 5A.

To illustrate, and in reference to FIG. 5B, both the first optical FOV 514 and the second optical FOV 516 extend away from both the first secondary imager 510 and the second secondary imager 512. Moreover, as the optical FOVs 514, 516 extend away from the secondary imager assembly 510, 512, the optical FOVs 514, 516 expand in both a vertical and horizontal (not shown) fashion with respect to the bioptic barcode reader 500. Hence, the second secondary imager 512 is positioned above the housing 502 such that, as the optical FOVs 514, 516 extend away from the secondary imager assembly 510, 512 and expand, the optical FOVs 514, 516 overlap at a point approximately equidistant from both the first secondary imager 510 and the second secondary imager 512.

The second secondary imager's 512 positioning is advantageous because it allows for more effective and efficient image stitching. For example, if a user attempts to purchase an large item (e.g., target object) at a POS station (e.g., bioptic barcode reader 500), the imaging equipment (e.g., secondary imager assembly 510, 512) of the POS station may have to capture multiple images (e.g., one or more second images) of the large item to acquire a complete image of the large item. Each of these multiple images will feature at least some different regions of the large item, and will then be combined (i.e., image stitching) to allow the POS station to analyze the complete image for item recognition purposes.

Because the second secondary imager 512 is positioned above the housing 502 such that the optical FOVs 514, 516 overlap approximately equidistantly from both components of the secondary imager assembly 510, 512, the secondary imager assembly 510, 512 will appear to capture the multiple images from an approximately equidistant perspective, relative to the large item. Thus, stitching the multiple images together to produce a composite image of the large item is greatly improved because stitching process can simply align similar portions of images without the need to resize or otherwise alter the images.

In certain embodiments, the housing 502 includes an upright scanning tower 518. In these embodiments, the overlap of the first optical FOV 514 with the second optical FOV 516 occurs proximately to a top forward corner of the upright scanning tower 518. For example, and as illustrated in FIG. 5B, the upright scanning tower 518 contains at least the primary illumination assembly 506, the first secondary imager 510, and has edges defined by the housing 502. In this example, the "top" of the upright scanning tower 518 is the portion of the upright scanning tower 518 that is facing the second secondary imager 512, and "forward" indicates a direction parallel with the direction in which the optical FOVs 514, 516 expand, as discussed herein.

Figure 6A:
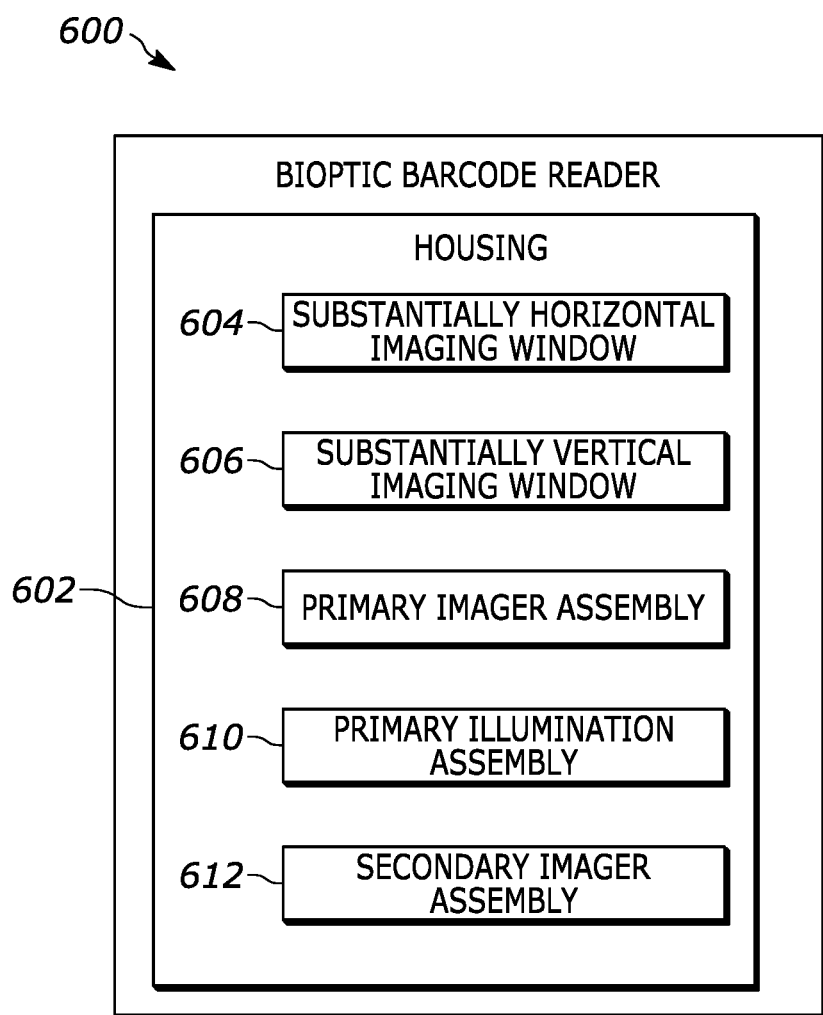
FIG. 6A illustrates an example bioptic barcode reader featuring a deep inset composition of a multicolor camera assembly and a monochromatic camera assembly.

FIG. 6A illustrates an example bioptic barcode reader 600 featuring a deep inset composition of a multicolor camera assembly and a monochromatic camera assembly. The example bioptic barcode reader 600 includes a housing 602. The housing 602 further includes a substantially horizontal imaging window 604 and a substantially vertical imaging window 606. The substantially horizontal imaging window 604 defines an imaging plane. In reference to FIG. 6B, the substantially vertical imaging window 606 includes a top edge 614 and a bottom edge 616.

The bioptic barcode reader 600 further includes, a primary imager assembly 608, a primary illumination assembly 610, and a secondary imager assembly 612. The primary imager assembly 608 includes one or more primary imagers (not shown) positioned within the housing 602. The one or more primary imagers are configured to capture one or more first images of one or more barcodes of one or more target objects.

The primary illumination assembly 610 is positioned within the housing, and is operable in an enabled state and a disabled state. Further, the primary illumination assembly 610 is configured to, in the enabled state, emit a primary illumination optimized for capturing the one or more first images of the one or more barcodes. For example, in the enabled state, the primary illumination assembly 610 may emit the primary illumination as a combination of a variety visible spectrum wavelengths (e.g., a combination of wavelengths to produce substantially white light) or a monochromatic visible spectrum wavelength (e.g., red light). In certain embodiments, the primary illumination is monochromatic illumination including near-infrared light.

The secondary imager assembly 612 includes one or more secondary imagers (not shown) configured to capture one or more second images of the one or more target objects when the primary illumination assembly is in either of the enabled state or the disabled state. However, in certain embodiments, the secondary imager assembly 612 is configured to capture one or more second images of the one or more target objects only when the primary illumination assembly 610 is in the disabled state.

Figure 6B:
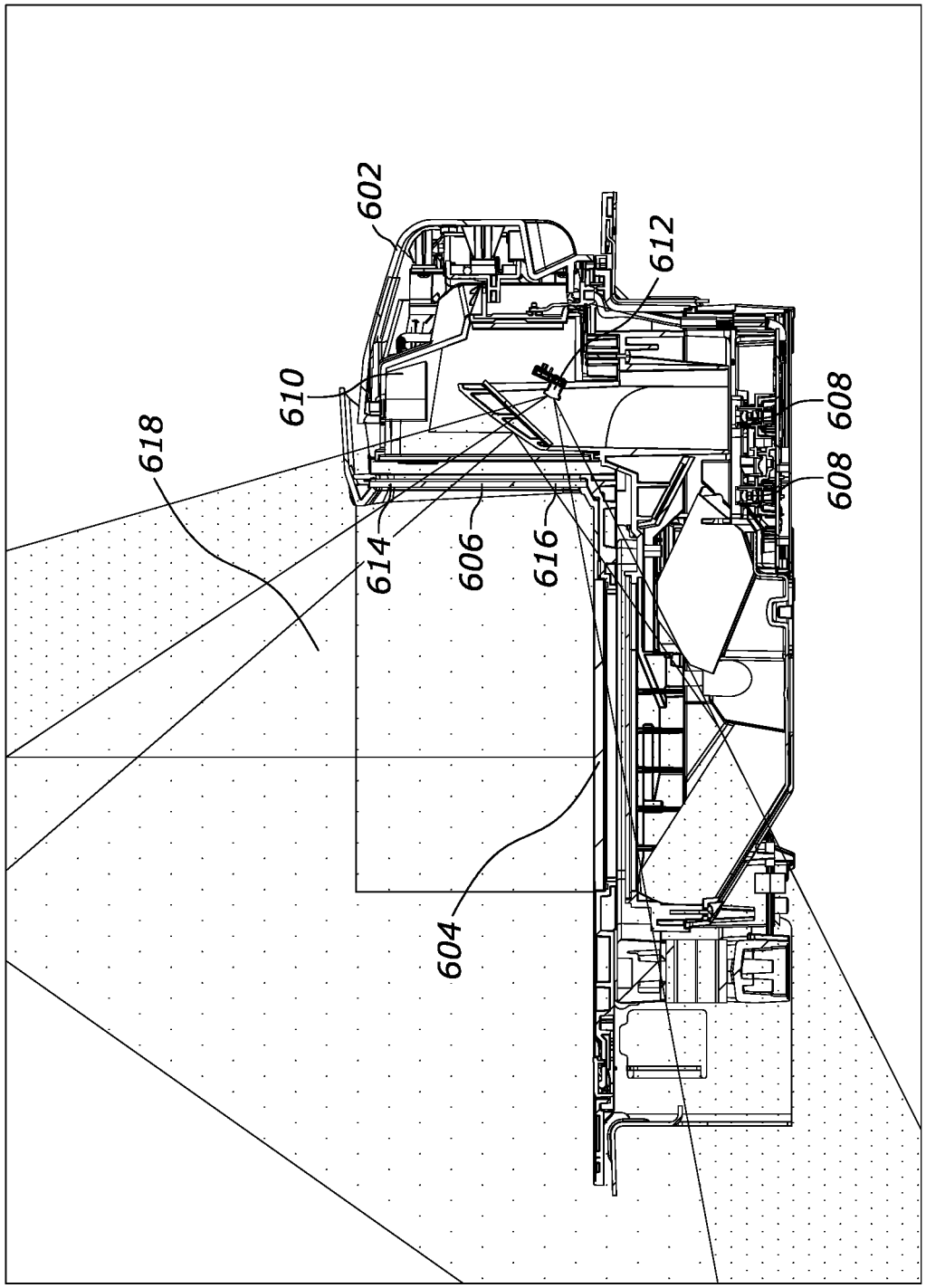
FIG. 6B is a profile cutaway view of the example bioptic barcode reader of FIG. 6A.

Moreover, and in reference to FIG. 6B, the one or more secondary imagers of the secondary imager assembly 612 include an optical FOV 618 through the vertical imaging window 606. The secondary imager assembly 612 is positioned within the housing 602 substantially linearly with the imaging plane such that the optical FOV 618 extends substantially from the bottom edge 616 and substantially to the top edge 614 of the substantially vertical imaging window 606. In certain embodiments, the secondary imager assembly 612 is adjustably positioned within the housing 602 substantially linearly with the imaging plane such that the optical FOV 618 extends at least from the bottom edge 616 to the top edge 614 of the substantially vertical imaging window 606.

The secondary imager assembly 612 is positioned as illustrated in FIG. 6B to achieve an increased effective imaging area for the bioptic barcode reader 600. To illustrate, the bioptic barcode reader 600 has an effective imaging area based on the areas the imaging assemblies 608, 612 are able to clearly view through the imaging windows 604, 606. The larger the effective imaging area of the bioptic barcode reader 600 becomes, the more effective the bioptic barcode reader 600 becomes at detecting and/or reading barcodes. Correspondingly, positioning the secondary imager assembly 612 within the housing 602, as described above and as illustrated in FIG. 6B, increases the area the secondary imager assembly 612 is able to view through the substantially vertical imaging window 606. When one or more target objects pass through the bioptic barcode reader 600 (e.g., a customer purchasing multiple items at a POS station), the one or more secondary imagers of the secondary imager assembly 612 will be more likely to successfully capture the one or more second images of the one or more target objects. Thus, positioning the secondary imager assembly 612 as described above, and as illustrated in FIG. 6B, achieves a more effective bioptic barcode reader 600 because it increases the effective imaging area of the bioptic barcode reader 600.

Figure 7A:
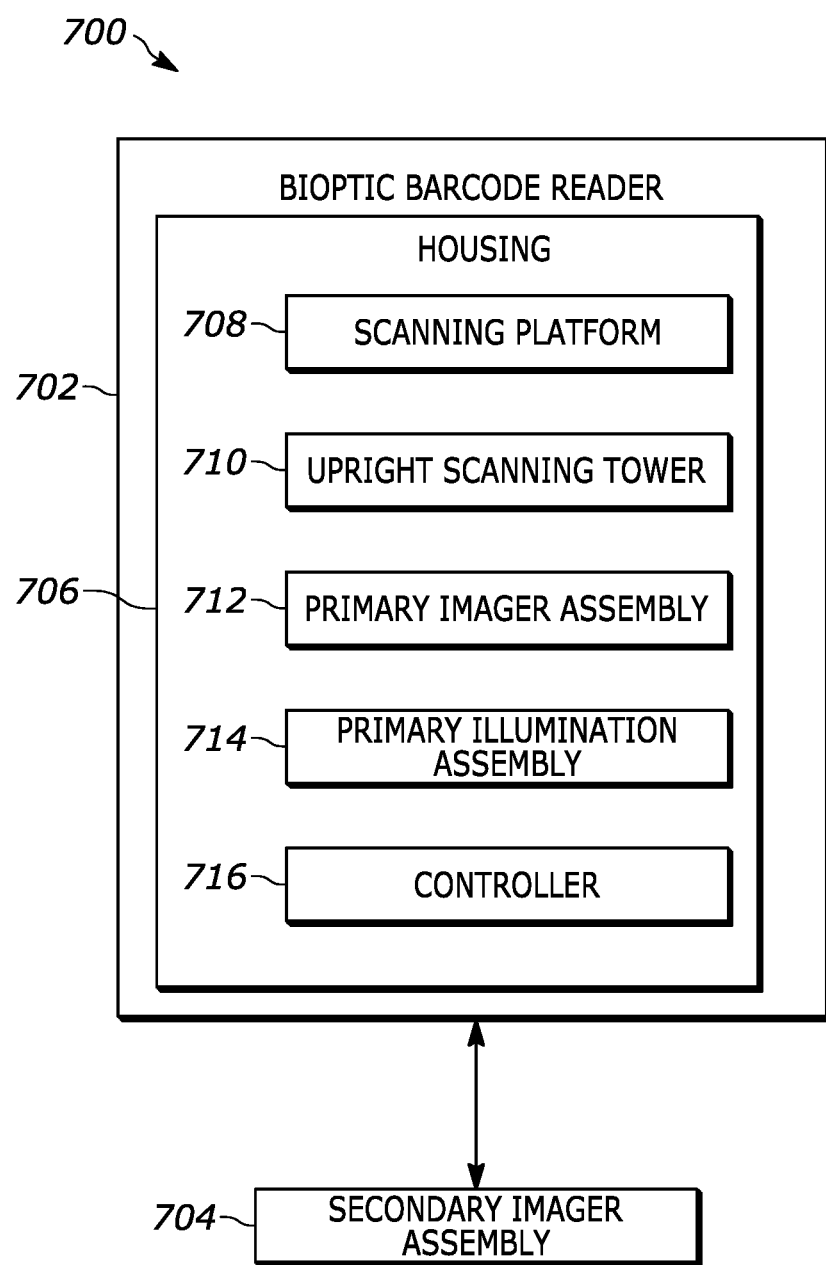
FIG. 7A illustrates an example composite system of a bioptic barcode reader and a color camera assembly.

FIG. 7A illustrates an example composite system 700 of a bioptic barcode reader 702 and a color camera assembly (e.g., secondary imager assembly 704). The bioptic barcode reader 702 includes a housing 706, which includes a scanning platform 708 and an upright scanning tower 710.

The bioptic barcode reader 702 further includes a primary imager assembly 712. The primary imager assembly 712 includes one or more primary imagers (not shown). The one or more primary imagers are positioned within the housing 706, and are configured to capture one or more first images of one or more barcodes of one or more target objects.

The bioptic barcode reader 702 further includes a primary illumination assembly 714. The primary illumination assembly 714 is positioned within the housing 706 and is operable in an enabled state and a disabled state. The primary illumination assembly 714 is configured to, in the enabled state, emit primary illumination optimized for capturing the one or more first images of the one or more barcodes. For example, in the enabled state, the primary illumination assembly 714 may emit the primary illumination as a combination of a variety visible spectrum wavelengths (e.g., a combination of wavelengths to produce substantially white light) or a monochromatic visible spectrum wavelength (e.g., red light). In certain embodiments, the primary illumination is monochromatic illumination including near-infrared light.

The bioptic barcode reader 702 further includes a controller 716. The controller 716 may be communicatively connected with the primary imager assembly 712, the primary illumination assembly 714, and the secondary imager assembly 704.

The secondary imager assembly 704 includes one or more secondary imagers (not shown). The one or more secondary imagers are configured to capture one or more second images of the one or more target objects when the primary illumination assembly 714 is in either of the enabled state or the disabled state. In certain embodiments, the one or more secondary imagers are configured to capture one or more second images of the one or more target objects only when the primary illumination assembly 714 is in the disabled state.

Figure 7B:
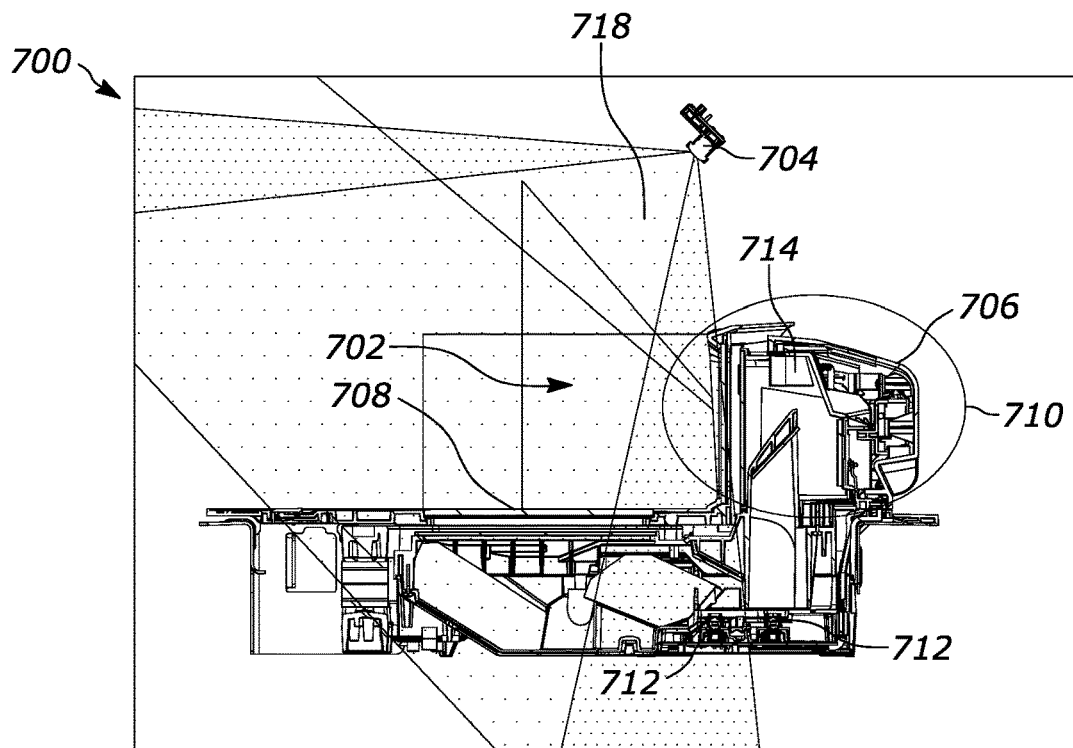
FIG. 7B is a profile cutaway view of the example composite system of FIG. 7A.

The secondary imager assembly 704 is positioned above the bioptic barcode reader 702 to increase the bioptic barcode reader's 702 ability to capture images of items (e.g., the one or more target objects) when they are placed anywhere on the scanning platform 708. To illustrate, and in reference to FIG. 7B, the one or more secondary imagers include an optical FOV 718. The secondary imager assembly 704 is positioned above the bioptic barcode reader 702 such that the optical FOV 718 (i) includes all of the scanning platform 708 and (ii) is unobscured by the upright scanning tower 710. Thus, positioning the secondary imager assembly 704 as discussed herein, and as illustrated in FIG. 7B, increases the bioptic barcode reader's 702 ability to capture images of items placed anywhere on the scanning platform 708 because the secondary imager assembly 704 has an unobscured optical FOV 718 covering the entire scanning platform 708.

In certain embodiments, the secondary imager assembly 704 is positioned above the bioptic barcode reader 702 by attaching the secondary imager assembly 704 to at least one of (i) a pole attached to the bioptic barcode reader 702, (ii) a pole detached from the bioptic barcode reader 702, (iii) a bracket attached to the bioptic barcode reader 702, (iv) a bracket detached from the bioptic barcode reader 702, and (v) a display displaced above the bioptic barcode reader 702. Further in these embodiments, the secondary imager assembly 704 is adjustably positioned above the bioptic barcode reader 702.

Figure 7C:
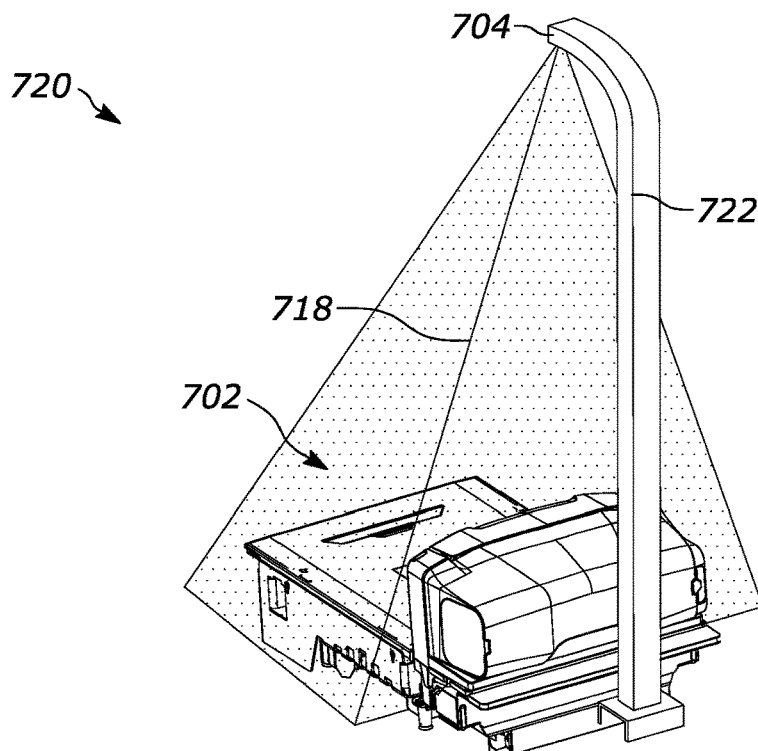
FIG. 7C is an exterior illustration of a pole-mounted embodiment of the example composite system of FIG. 7A.

For example, as illustrated in FIG. 7C, the secondary imager assembly 704 is positioned above the bioptic barcode reader 702 by attaching the secondary imager assembly 704 to a pole 722 attached to the bioptic barcode reader 702. The pole 722 may be adjustable to allow a user to select an optimal position for the secondary imager assembly 704 above the bioptic barcode reader 702. To illustrate, one or more of the one or more target objects may be large objects requiring substantial vertical clearance to pass across the scanning platform 708 without contacting the secondary imager assembly 704 or obscuring the optical FOV 718. Thus, a user may adjust the position of the secondary imager assembly 704 above the bioptic barcode reader 702 (via the pole 722) such that the one or more target objects have clearance to pass across the scanning platform 708 without contacting the secondary imager assembly 704 or obscuring the optical FOV 718.

Figure 8A:
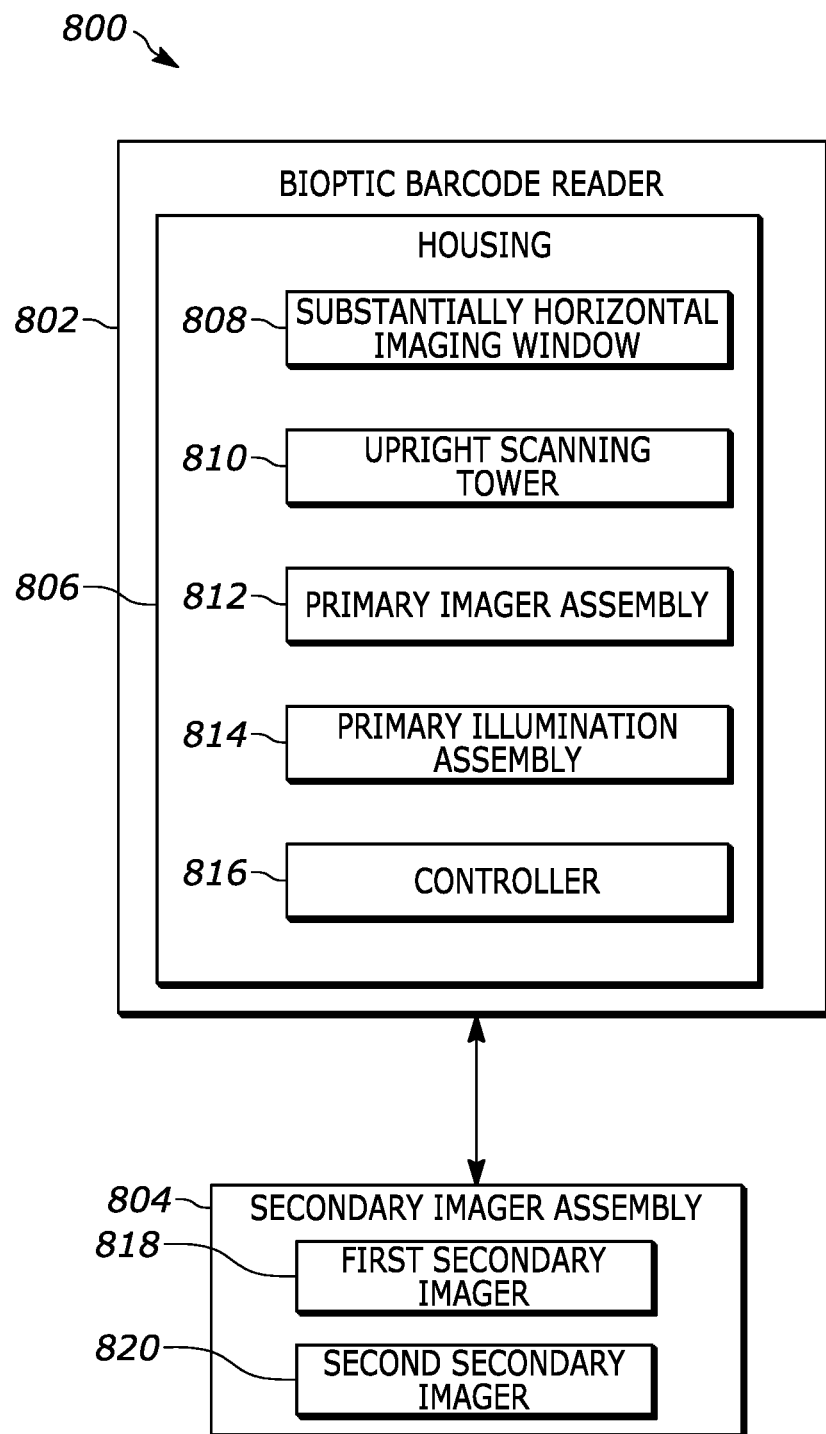
FIG. 8A illustrates another example composite system of a bioptic barcode reader and a color camera assembly.

FIG. 8A illustrates another example composite system 800 of a bioptic barcode reader 802 and a color camera assembly (e.g., secondary imager assembly 804). The bioptic barcode reader 802 includes a housing 806, which includes a substantially horizontal imaging window 808 and an upright scanning tower 810. The upright scanning tower 810 includes a substantially vertical imaging window (not shown).

The bioptic barcode reader 802 further includes a primary imager assembly 812. The primary imager assembly 812 includes one or more primary imagers (not shown) that are positioned within the housing 806. The one or more primary imagers are configured to capture one or more first images of one or more barcodes of one or more target objects.

The bioptic barcode reader 802 further includes a primary illumination assembly 814 positioned within the housing 806. The primary illumination assembly 814 is operable in an enabled state and a disabled state. Moreover, in the enabled state, the primary illumination assembly 814 is configured to emit primary illumination optimized for capturing the one or more first images of the one or more barcodes. For example, in the enabled state, the primary illumination assembly 814 may emit the primary illumination as a combination of a variety visible spectrum wavelengths (e.g., a combination of wavelengths to produce substantially white light) or a monochromatic visible spectrum wavelength (e.g., red light). In certain embodiments, the primary illumination is monochromatic illumination including near-infrared light.

The bioptic barcode reader 802 further includes a controller 816. The controller 816 may be communicatively connected with the primary imager assembly 812, the primary illumination assembly 814, and the secondary imager assembly 804.

The secondary imager assembly 804 is configured to capture one or more second images of the one or more target objects when the primary illumination assembly 814 is in either of the enabled state or the disabled state. In certain embodiments, the secondary imager assembly 804 is configured to capture one or more second images of the one or more target objects only when the primary illumination assembly 814 is in the disabled state.

The secondary imager assembly 804 includes a first secondary imager 818. The first secondary imager 818 is positioned at a first corner of the upright scanning tower 810 and in front of the substantially vertical imaging window. Moreover, and in reference to FIG. 8B, the first secondary imager 818 has a first optical FOV 822.

Figure 8B:
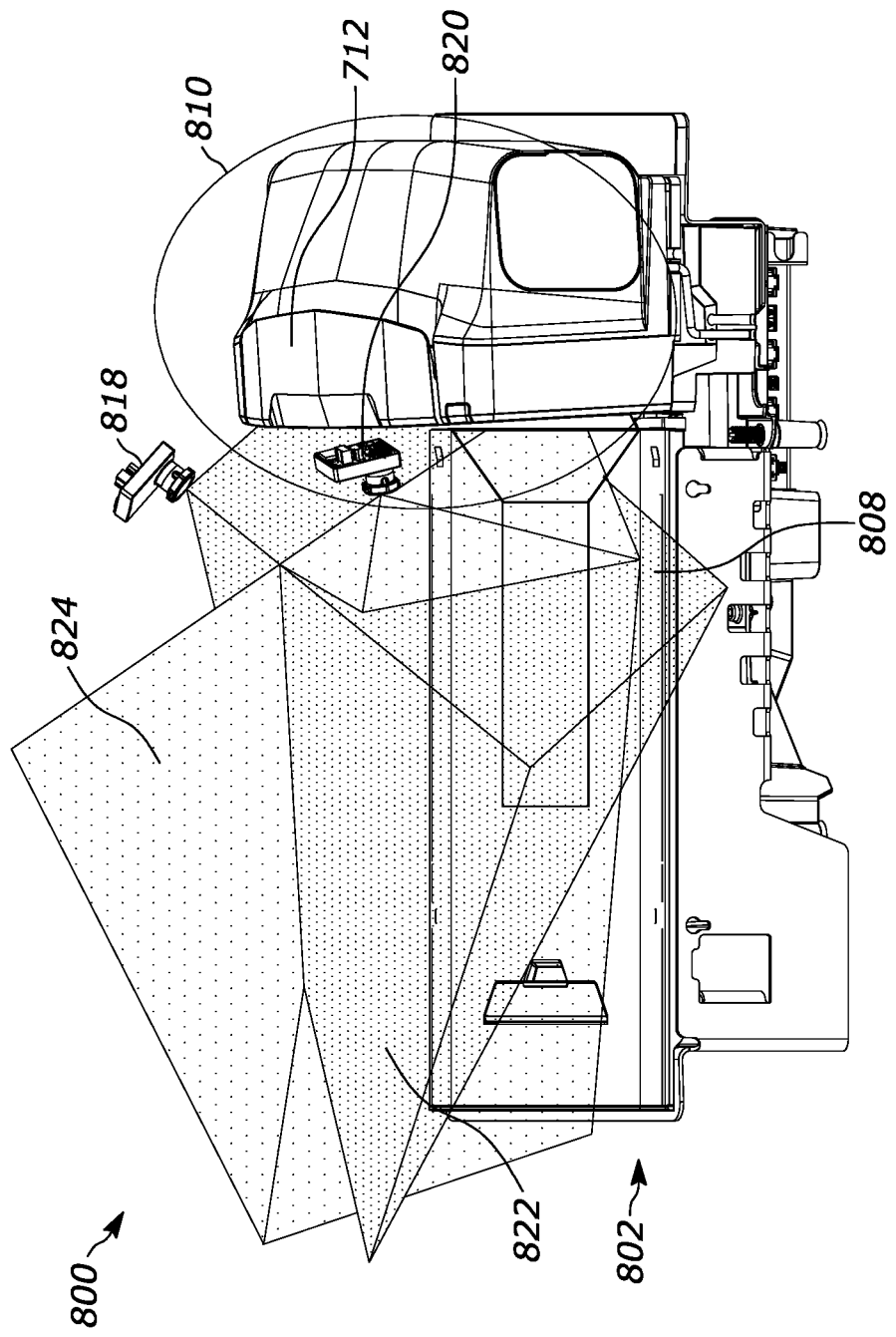
FIG. 8B is a profile view of the example composite system of FIG. 8A.

The secondary imager assembly 804 includes a second secondary imager 820, which has a second optical FOV 824, when considered in tandem with the first secondary imager 818, is positioned to increase the bioptic barcode reader's 802 visibility across the substantially horizontal imaging window 808, including areas beyond the substantially horizontal imaging window 808. To illustrate, the second secondary imager 820 is positioned at a second corner of the upright scanning tower 810 and in front of the substantially vertical imaging window such that an overlap of the first optical FOV 822 with the second optical FOV 824 occurs at least until the distal end of the substantially horizontal imaging window 808 with respect to the upright scanning tower 810. Thus, positioning the secondary imager assembly 804 in the way described herein, and as illustrated in FIG. 8B, increases the bioptic barcode reader's 802 visibility across the substantially horizontal imaging window 808 because the optical FOVs 822, 824 overlap at least until the distal (e.g., far) end of the substantially horizontal imaging window 808 with respect to the upright scanning tower 810.

Additionally, this positioning increases the bioptic barcode reader's 802 visibility across areas beyond the substantially horizontal imaging window 808. For example, a POS station may have a conveyor belt leading to the bioptic barcode reader 802 to bring one or more target objects closer to the bioptic barcode reader 802 so that the one or more target objects may be scanned, imaged, or otherwise identified. Similarly, the POS station may have a bagging area on the opposite side from the conveyor belt so that the one or more target objects may be bagged after they have been identified. Thus, the secondary imager assembly's 804 positioning increases the bioptic barcode reader's 802 visibility across areas beyond the substantially horizontal imaging window 808 because, as illustrated in FIG. 8B, the optical FOVs 822, 824 extend into areas adjacent to the substantially horizontal imaging window 808 (e.g., a conveyor belt, a bagging area, etc.). With increased visibility across areas beyond the substantially horizontal imaging window 808, the bioptic barcode reader 802 can more effectively identify, track, or otherwise indicate any item that was, for example, not scanned by a cashier, intentionally stolen, or subject to "sweethearting".

In certain embodiments, the housing 806 further comprises a scanning platform (not shown). The scanning platform includes the substantially horizontal imaging window. In these embodiments, the overlap of the first optical FOV 822 with the second optical FOV 824 occurs at least until the distal end of the scanning platform.

In other embodiments, either of the first secondary imager 818 or the second secondary imager 820 is adjustably positioned on the upright scanning tower 810.

Antitheft devices are gaining traction at many retail stores throughout the world due, in part, to the large amount of inventory shrinkage taking place. At POS stations, traditional methods involve antitheft devices installed in the ceiling or some distance from the POS station. It is desirable to stamp the images obtained by any antitheft system at a POS station with either the decode or time from the POS. However, if the antitheft imaging device is positioned away from the POS station, physically wiring the imaging device to the POS system to obtain this stamping information is difficult. This added difficulty translates to added cost and effort to install a POS antitheft device.

Figure 9:
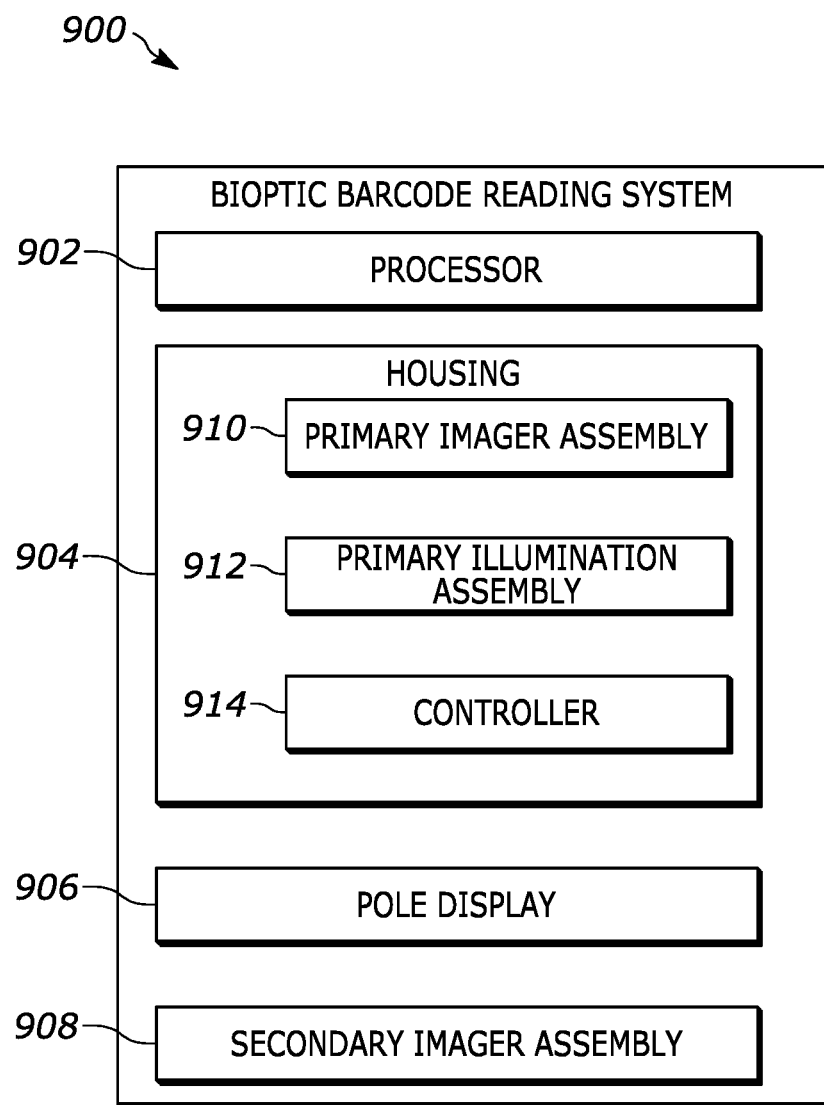
FIG. 9 illustrates a bioptic barcode reading system, in accordance with several of the embodiments discussed herein.

FIG. 9 illustrates a bioptic barcode reading system 900 in accordance with several of the embodiments discussed herein. The bioptic barcode reading system 900 includes one or more processors 902, a housing 904, a pole display 906, and a secondary imager assembly 908. The pole display 906 is connected to the housing 904. The pole display 906 may be communicatively coupled to the one or more processors 902, the primary imager assembly 910, the primary illumination assembly 912, the controller 914, and the secondary imager assembly 908. For example, the pole display 906 may display the weight and cost of items (e.g., one or more target objects) weighed and identified by the bioptic barcode reading system 900.

The bioptic barcode reading system 900 further includes a primary imager assembly 910, which is positioned within the housing 904. The primary imager assembly 910 includes one or more primary imagers (not shown) that are communicatively coupled to the one or more processors 902. The one or more primary imagers are configured to capture one or more images of one or more barcodes of one or more target objects.

The bioptic barcode reading system 900 further includes a primary illumination assembly 912. The primary illumination assembly 912 is positioned within the housing 904, and is operable in an enabled state and a disabled state. The primary illumination assembly 912 is configured to, in the enabled state, emit primary illumination optimized for capturing the one or more images of the one or more barcodes in the enabled state. For example, in the enabled state, the primary illumination assembly 714 may emit the primary illumination as a combination of a variety visible spectrum wavelengths (e.g., a combination of wavelengths to produce substantially white light) or a monochromatic visible spectrum wavelength (e.g., red light). In certain embodiments, the primary illumination is monochromatic illumination including near-infrared light.

The bioptic barcode reading system 900 further includes a controller 914. The controller 914 may be communicatively connected with the primary imager assembly 910, the primary illumination assembly 912, the pole display 906, and the secondary imager assembly 908.

The secondary imager assembly 908 includes one or more secondary imagers (not shown) configured to capture one or more second images of the one or more target objects when the primary illumination assembly 912 is in either of the enabled state or the disabled state. In certain embodiments, the secondary imager assembly 908 is configured to capture one or more second images of the one or more target objects only when the primary illumination assembly 912 is in the disabled state.

The secondary imager assembly 908 is mounted on the pole display 906, and is communicatively coupled to the one or more processors 902. In certain embodiments, the secondary imager assembly 908 is mounted inside the pole display 906, and communicatively coupled to the one or more processors 902. Moreover, in other embodiments, the secondary imager assembly 908 is adjustably mounted on the pole display 906.

Mounting the secondary imager assembly 908 on the pole display 906 and communicatively coupling the secondary imager assembly 908 to the one or more processors 902 of the bioptic barcode reading system 900 greatly increases the efficacy of POS antitheft efforts. For example, the secondary imager assembly 908 can associate the decode and/or time stamping data from the bioptic barcode reading system 900 with the one or more captured second images of the one or more target objects because it is communicatively coupled with the one or more processors 902 via the pole display 906.

The secondary imager assembly 908 would also be ideally located to check the contents of a shopping cart based on its location proximate to the customer at the POS station. For example, the secondary imager assembly 908 could be oriented to check the contents of a customer's shopping cart at the end of a sale to determine if the shopping cart is empty. Additionally or alternatively, the secondary imager assembly 908 could be configured to determine if every item in the customer's shopping cart is placed in a bag, as a final check to determine every item was, in fact, paid for.

The secondary imager assembly 908 would further be ideally located to check items (e.g., one or more target objects) as they pass through the POS station. For example, the secondary imager assembly 908 may be oriented to check items on a conveyor belt leading up to and/or away from the bioptic barcode reading system 900. In this orientation, the secondary imager assembly 908 could be configured to count the number of items entering and/or leaving the bioptic barcode reading system 900 FOV.

The secondary imager assembly 908 may also be ideally located to identify potential "ticket switching" of items passed through the bioptic barcode reading system 900 FOV. For example, the secondary imager assembly 908 may be positioned such that the one or more second images captured of a target object are sufficient to determine a mismatch between the product passed through the bioptic barcode reading system 900 FOV and the barcode captured by the primary imager assembly 910.

Bioptic systems use color cameras for a multitude of different object and gesture recognition purposes at the point of sale. Ideally, such a camera is illuminated with white light to retain the best color information to aid in object identification. However, adding illumination inside a bioptic vertical tower according to traditional methods is extremely problematic, as it causes internal reflections that are seen in the color camera FOV. Additionally, color cameras should have a very tall FOV in order to see even the largest objects, so any illumination source placed inside the vertical tower to cover such a tall FOV will inevitably blind the user.

Figure 10:
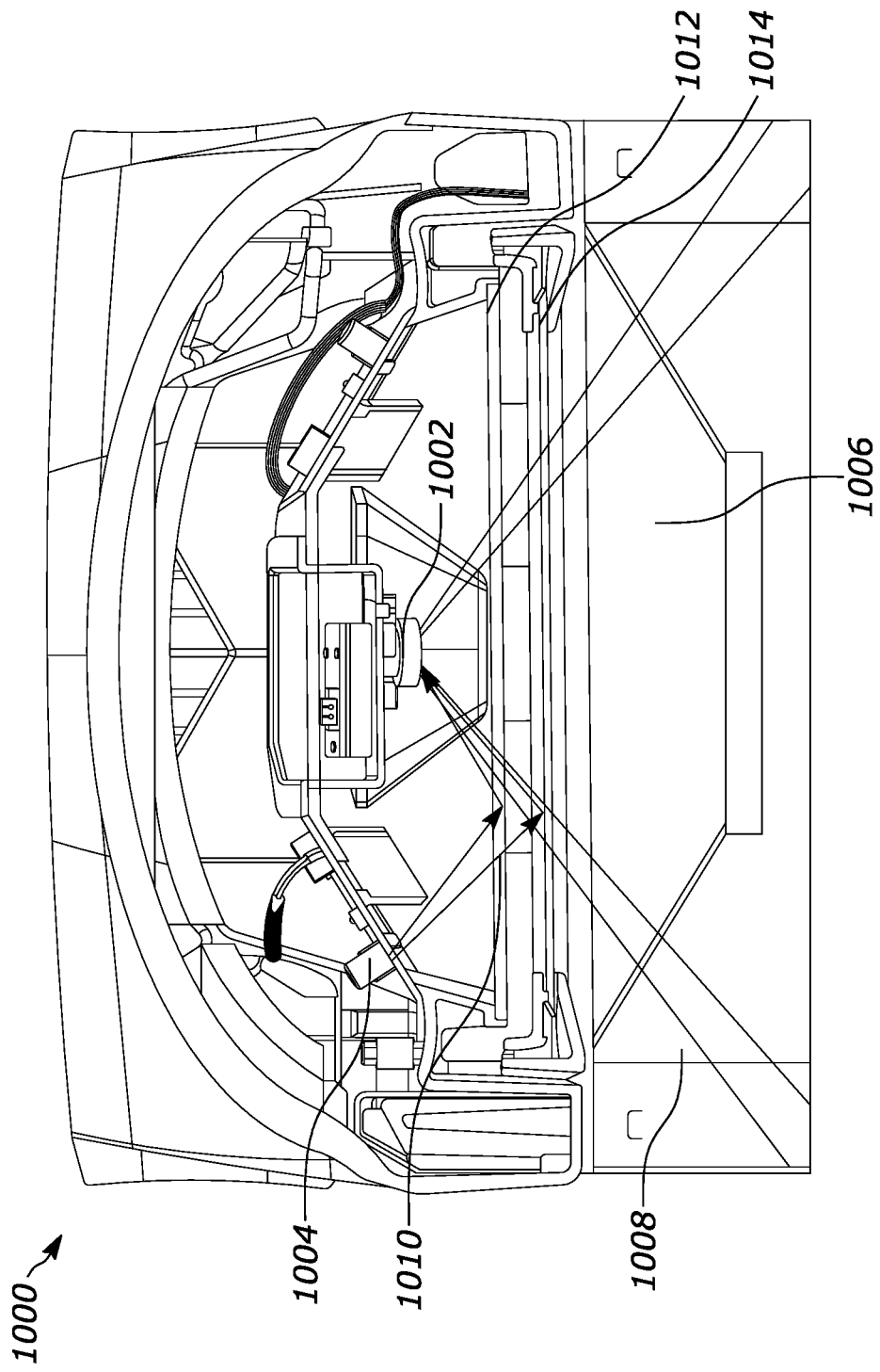
FIG. 10 illustrates a conventional bioptic scanning device utilizing an internal color camera and an internal illumination source, wherein the internal illumination source interferes with the internal color camera.

FIG. 10 illustrates a conventional bioptic scanning device 1000 utilizing an internal color camera 1002 and an internal illumination source 1004, wherein the internal illumination source 1004 interferes with the internal color camera 1002. The conventional bioptic scanning device 1000 further includes a color camera FOV 1006, a scanning platter 1008, an internal illumination path 1010, a first imaging window 1012, and a second imaging window 1014.

The illumination emitted by the internal illumination source 1004 reflects off of the imaging windows 1012, 1014, as illustrated by the internal illumination path 1010, into the color camera FOV 1006. This unintentional illumination of the color camera FOV 1006 distorts images captured by the internal color camera 1002, degrades the motion sensitivity of the internal color camera 1002, and can increase the internal color camera's 1002 exposure time necessary to capture images of the object of interest.

Figure 11A:
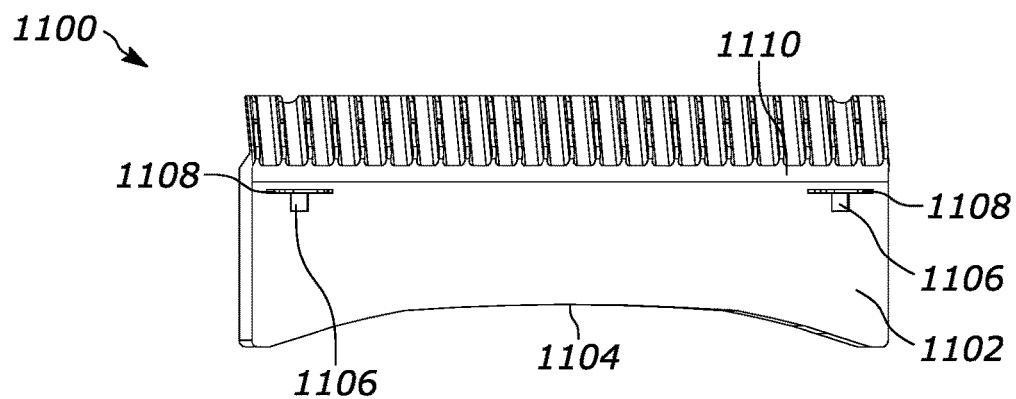
FIG. 11A is a front view of an example illumination adapter for use with a bioptic barcode reader.

To solve these and other problems, and with reference to FIG. 11A, an illumination adapter 1100 for use with a bioptic barcode reader is disclosed. The illumination adapter 1100 includes one or more illumination components (not shown) having an effective range. The illumination adapter 1100 further includes a first surface 1102 shaped to receive the one or more illumination components, and a bottom portion 1104 situated below the one or more illumination components. In certain embodiments, and as discussed further herein, the illumination adapter also includes one or more cavities 1106, and one or more baffles 1108. In other embodiments, the first surface 1102 is a first planar surface.

Figure 11B:
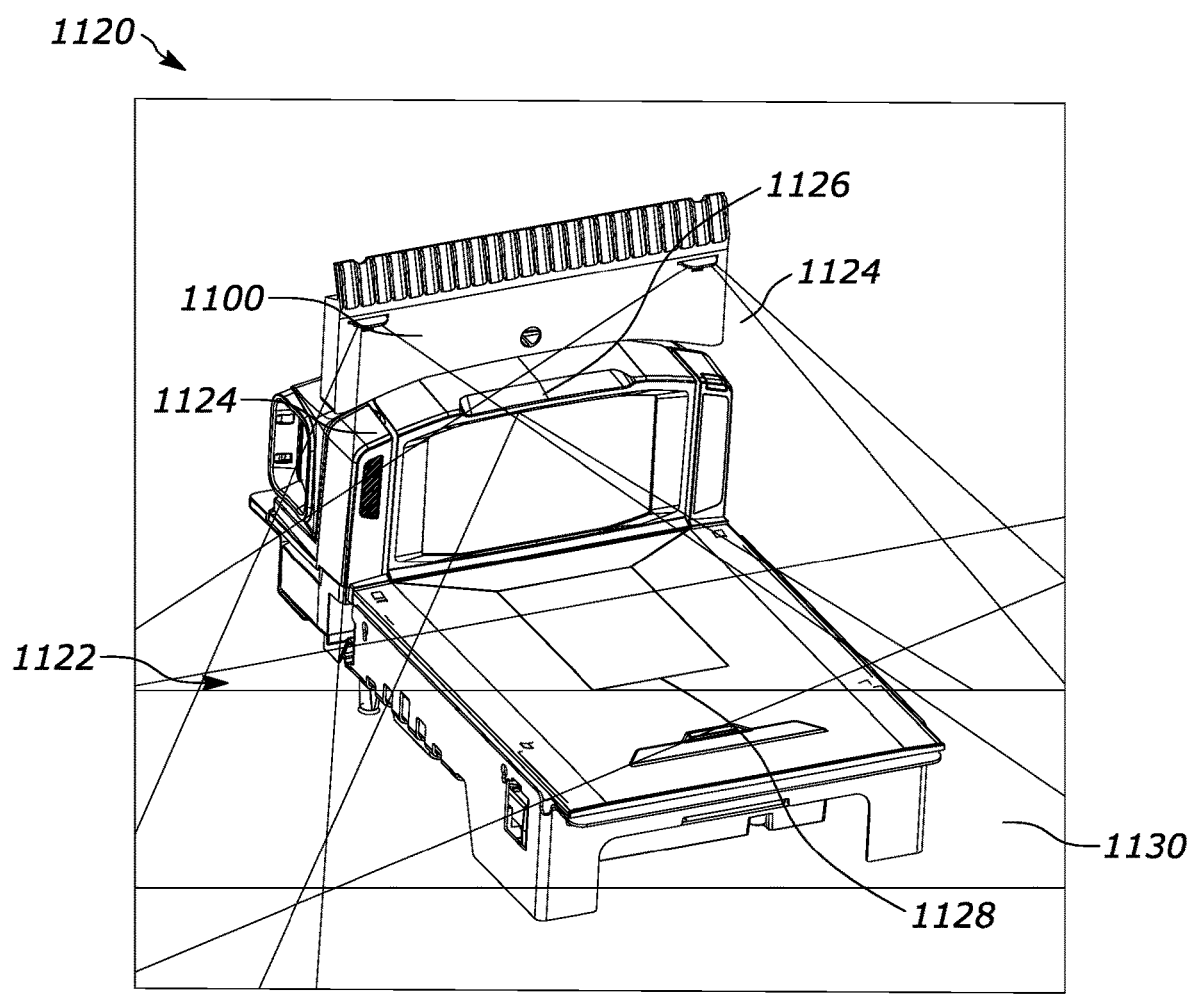
FIG. 11B illustrates a combined system of the illumination adapter of FIG. 11A with a bioptic barcode reader.

The bottom portion 1104, in reference to the combined system 1120 illustrated in FIG. 11B, is adapted to detachably connect to the bioptic barcode reader 1122, and the one or more illumination components are positioned such that the effective range 1124 is both (i) unobscured by a top flange 1126 of the bioptic barcode reader 1122 and (ii) illuminates at least a majority of a weighing platter 1128 of the bioptic barcode reader 1122. In other embodiments, the bottom portion 1104 is adapted to detachably connect to the bioptic barcode reader. In one embodiment, the bottom portion 1104 is adapted to detachably connect to the bioptic barcode reader by at least one of (i) snaps, (ii) double sided adhesive, and (iii) screws. In another embodiment, the bottom portion 1104 is adapted to detachably connect to a bracket displaced above the bioptic barcode reader by at least one of (i) snaps, (ii) double sided adhesive, and (iii) screws. Additionally, the bottom portion 1104 may be adjustable such that the illumination adapter 1100 may be moved horizontally (i.e., forwards, backwards, and/or laterally), moved vertically, tilted, rotated, and/or otherwise shifted with respect to the bioptic barcode reader 1122.

In other embodiments, the illumination adapter 1100 includes a top portion 1110 situated above the one or more illumination components. The top portion 1110 is adapted to detachably connect to at least one of (i) a monitor (not shown) above the bioptic barcode reader 1122 or (ii) a bracket (not shown) above the bioptic barcode reader 1122.

Moreover, the one or more illumination components are positioned such that the effective range 1124 is both (i) unobscured by a top flange 1126 of the bioptic barcode reader 1122 and (ii) illuminates at least a majority of a weighing platter 1128 of the bioptic barcode reader 1122. Further in these embodiments, the top portion 1110 is connected substantially perpendicular to the first surface 1102. Still further in these embodiments, the top portion 1110 is adapted to detachably connect to the at least one of (i) a monitor (not shown) above the bioptic barcode reader 1122 or (ii) a bracket (not shown) above the bioptic barcode reader 1122 by at least one of (i) snaps, (ii) double sided adhesive, and (iii) screws. Additionally, the top portion 1110 may be adjustable such that the illumination adapter 1100 may be moved horizontally (i.e., forwards, backwards, and/ or laterally), moved vertically, tilted, rotated, and/or otherwise shifted with respect to the bioptic barcode reader 1122.

In certain embodiments, the first surface 1102 is further shaped to include one or more cavities 1106 to receive the one or more illumination components, and the bottom portion 1104 is connected substantially perpendicular to the first surface 1102. The one or more cavities 1106 facilitate the inclusion of the one or more illumination components, and provide openings for the one or more illumination components to illuminate the weighing platter 1128 across the effective range 1124. For example, the one or more cavities 1106 may be spaced as far right and as far left as possible on the first surface 1102. This maximized spacing across the first surface 1102 further enhances the imaging effectiveness of the bioptic barcode reader 1122 by reducing the specular reflections from objects being imaged.

Advantageously, and as illustrated in FIG. 11B, the effective range 1124 covers the entirety of a color camera FOV 1130. Thus, and as discussed herein, the one or more cavities 1106 allow the one or more illumination components to completely illuminate any objects passing through the color camera FOV 1130 without distorting or otherwise negatively impacting the resulting images of the color camera. These advantages allow the combined system 1120 to capture more representative images than traditional systems, which further allows the combined system 1120 to more effectively perform machine learning (e.g., convolutional neural network) for faster, more reliable object identification.

Figure 11C:
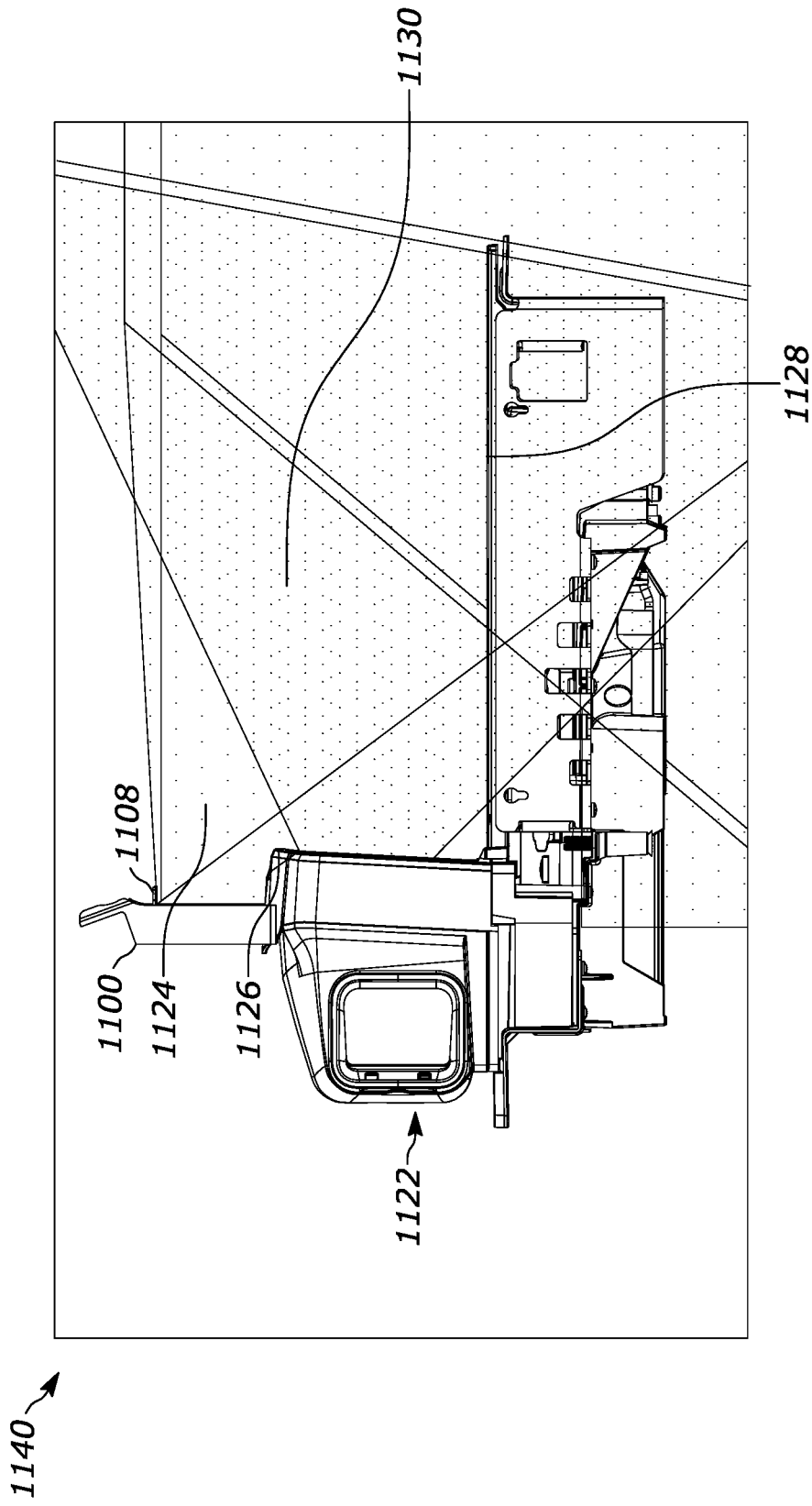
FIG. 11C is a profile view of the combined system of the illumination adapter of FIG. 11A with a bioptic barcode reader.

In other embodiments, the first surface 1102 vertically extends up to 7 inches from the weighing platter 1128 of the bioptic barcode reader 1122. For example, and as illustrated by the profile view 1140 in FIG. 11C, the illumination adapter 1100 is positioned above the bioptic barcode reader 1122 such that the effective range 1124 is unobscured by the top flange 1126 of the bioptic barcode reader 1100. If the first surface 1102 extends vertically extends up to 7 inches from the weighing platter 1128, the illumination adapter 1100 would fit within the existing gap between the bioptic barcode reader 1100 and other auxiliary equipment while still providing illumination defined by an effective range 1124 which is both (i) unobscured by the top flange 1126 of the bioptic barcode reader 1122 and (ii) illuminates at least a majority of the weighing platter 1128 of the bioptic barcode reader 1122.

In particular embodiments, the illumination adapter 1100 further includes one or more baffles 1108 coupled to the first surface 1102. The one or more baffles 1108 are configured to block at least an upper portion of the effective range 1124 of the one or more illumination components. Hence, the one or more baffles 1108 minimize eye annoyance to the user of the bioptic barcode reader because the effective range 1124 of the one or more illumination components will not extend high enough to reach the user's FOV. Moreover, the one or more baffles 1108 may be adjustable or interchangeable to further modify the effective range 1124.

Figure 12A:
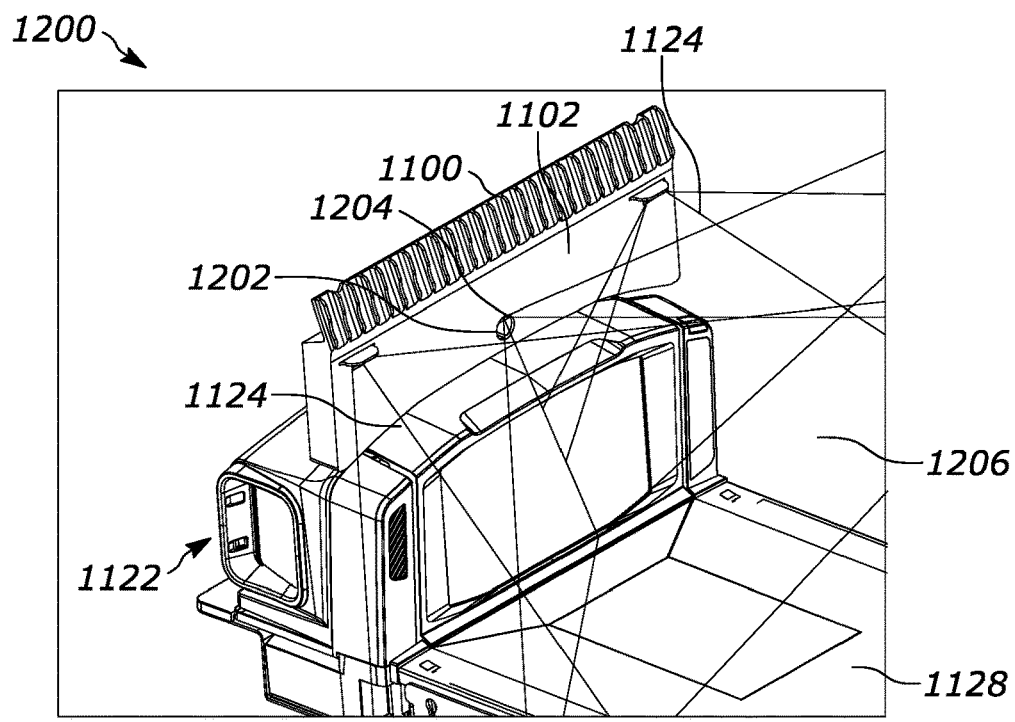
FIG. 12A illustrates a combined system of an illumination adapter featuring an imager assembly with a bioptic barcode reader.
Figure 12B:
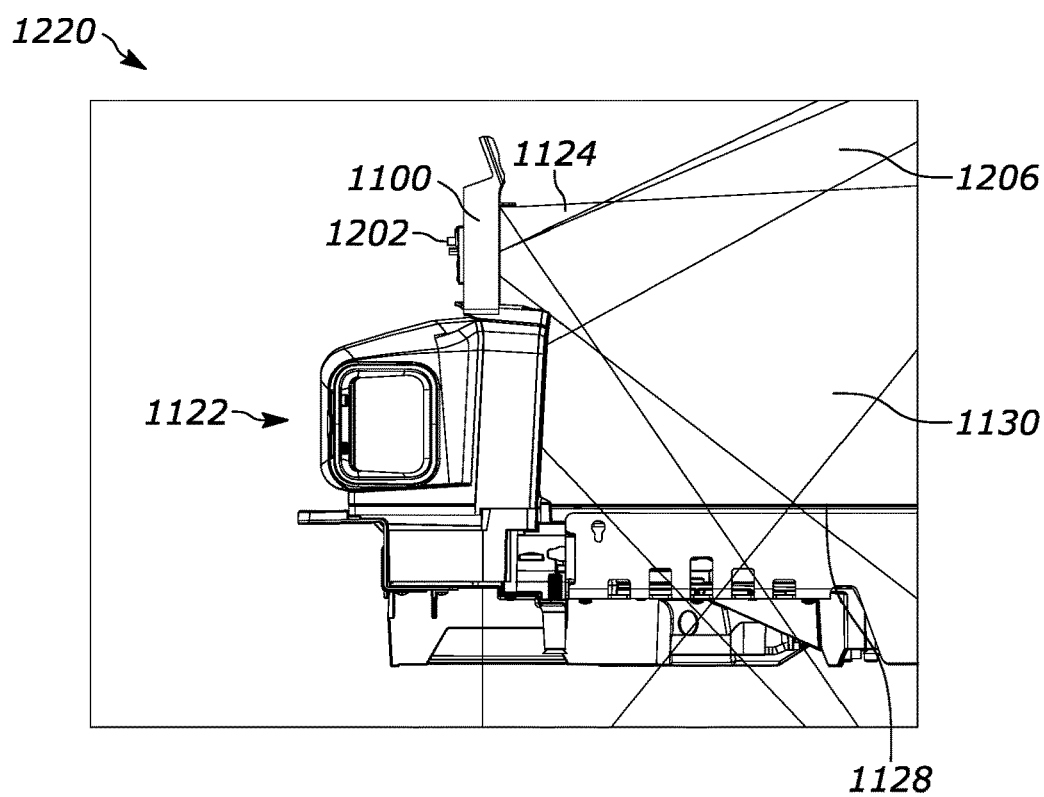
FIG. 12B is a profile view of the combined system of FIG. 12A.

In other embodiments, and as illustrated in the combined system 1200 of FIG. 12A, the illumination adapter 1100 includes an imager assembly 1202 including one or more imagers configured to capture one or more images of one or more target objects. The first surface 1102 is further shaped to include one or more secondary cavities 1204 to receive at least a portion of the imager assembly 1202. The imager assembly 1202 also has a second effective range 1206, which may extend beyond the effective range 1124 of the one or more illumination components and/or the color camera FOV 1130. In this way, the imager assembly 1202 provides the combined system 1200 with a greater FOV than a system including only the one or more illumination components. For example, and as illustrated by the profile view 1220 in FIG. 12B, the second effective range 1206 extends beyond the color camera FOV 1130. Thus, the system illustrated in the profile view 1220 of FIG. 12B has a higher combined FOV for color imaging, and allows for color imaging in systems where a color imager is not included internally.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A barcode reading device comprising:
    a housing;
    a primary imager assembly including one or more primary imagers positioned within the housing, the one or more primary imagers configured to capture one or more first images associated with one or more target objects;

a primary illumination assembly positioned within the housing, wherein the primary illumination assembly is operable in a first state and a second state, and wherein the primary illumination assembly is configured to emit primary illumination in the first state; and a secondary imager assembly including one or more secondary imagers configured to capture one or more secondary images when the primary illumination assembly is in either of the enabled state or the disabled state.

2. The barcode reading device of claim 1, further comprising:

a controller configured to sequentially capture (i) a plurality of first images with the primary imager assembly and (ii) a plurality of the one or more secondary images with the secondary imager assembly, wherein the plurality of first images are sequenced between the plurality of the one or more secondary images.

3. The barcode reading device of claim 2, wherein:

the secondary imager assembly is positioned externally from the housing; and the controller is further configured to:

output a trigger signal to the secondary imager assembly to enable functionality of the second imager assembly to capture the plurality of the one or more secondary images.

4. The barcode reading device of claim 1, wherein the primary illumination is monochromatic illumination including near-infrared light.

5. The barcode reading device of claim 1, wherein the primary imager assembly is a bioptic camera positioned at a surface of a point of sale station, and wherein the secondary imager assembly is a color camera positioned at an area above the surface of the point of sale station.

\* \* \* \* \*